United States Patent [19]
Takahashi et al.

[11] Patent Number: 5,832,400
[45] Date of Patent: Nov. 3, 1998

[54] CONTROLLING VEHICULAR DRIVING FORCE IN ANTICIPATION OF ROAD SITUATION ON WHICH VEHICLE IS TO RUN UTILIZING VEHICULAR NAVIGATION SYSTEM

[75] Inventors: Hiroshi Takahashi, Tokyo; Hitoshi Kidokoro; Akira Shiratori, both of Yokohama, all of Japan

[73] Assignee: Nissan Motor Co.., Ltd., Kanagawa, Japan

[21] Appl. No.: 523,096

[22] Filed: Sep. 1, 1995

[30] Foreign Application Priority Data

Sep. 5, 1994 [JP] Japan ..................................... 6-235867

[51] Int. Cl.⁶ .................................................... B60K 31/04
[52] U.S. Cl. .................................. 701/53; 701/58; 701/65
[58] Field of Search ..................... 364/424.082, 424.083, 364/424.084, 424.085, 424.087, 424.094, 431.04, 431.051, 431.054; 701/53, 54, 55, 56, 58, 65, 102, 103, 106

[56] References Cited

U.S. PATENT DOCUMENTS

| | | | |
|---|---|---|---|
| 4,380,048 | 4/1983 | Kishi et al. ....................... | 364/424.082 |
| 4,630,508 | 12/1986 | Klatt ................................. | 364/424.083 |
| 4,743,913 | 5/1988 | Takai . | |
| 4,899,285 | 2/1990 | Nakayama et al. . | |
| 5,371,678 | 12/1994 | Nomura . | |
| 5,410,477 | 4/1995 | Ishii et al. .......................... | 364/431.04 |
| 5,419,207 | 5/1995 | Kobayashi et al. . | |

FOREIGN PATENT DOCUMENTS

| | | |
|---|---|---|
| 2-48210 | 2/1990 | Japan . |
| 2-194406 | 8/1990 | Japan . |
| 2-231611 | 9/1990 | Japan . |
| 2-310800 | 12/1990 | Japan . |
| 3-182841 | 8/1991 | Japan . |
| 4-218435 | 8/1992 | Japan . |

*Primary Examiner*—William A. Cuchlinski, Jr.
*Assistant Examiner*—Edward Pipala
*Attorney, Agent, or Firm*—McDermott, Will & Emery

[57] ABSTRACT

In an apparatus and method utilizing a navigation system for controlling a driving force to be exerted at an estimated position at which the vehicle is to pass to reach to a destination at which the vehicle is finally to reach, a running road estimating block estimates a future position of the own vehicle in which the vehicular driving force controlling apparatus is mounted on the basis of a present position of the own vehicle. The estimated future position is a point of a road for the vehicle to pass several seconds after a time at which the own vehicle is placed at the present position specified from a recorded content of an electronic road map stored in, for example, CD-ROM. A driving force predicting block determines a present vehicular load state derived by a running resistance measuring block as a required driving force at the estimated position by correcting the present vehicular load state by a height difference between the estimated position and the present position. A driving system controlling block changes a setting of an engine and/or automatic power transmission according to a magnitude of the required driving force at the present position.

26 Claims, 17 Drawing Sheets

MOVEMENT OF ANTICIPATED ROAD POINT DUE TO WINKER (DIRECTION INDICATOR) OPERATION

# CONTROLLING VEHICULAR DRIVING FORCE IN ANTICIPATION OF ROAD SITUATION ON WHICH VEHICLE IS TO RUN UTILIZING VEHICULAR NAVIGATION SYSTEM

BACKGROUND OF THE INVENTION

The present invention relates to apparatus and method for controlling a vehicular driving force in anticipation of a road situation on which the vehicle is to run utilizing a vehicular navigating system. The present invention, more particularly, relates to apparatus and method for controlling the vehicular driving force which adjusts operation modes of a power train, such as at least either or both of automotive engine or automatic power transmission basically with a gradient of a road to be passed several seconds after a time at which the vehicle is at the present position and to be searched from an electronic road map taken into consideration.

A vehicular navigation system has been put into practice in which a route guidance from the present position of the vehicle (vehicle start position) to a destination to which the vehicle is finally to reach is carried out with a past running locus of the own vehicle (in which the navigation system is mounted) and the present position of the vehicle superimposed on a road map as an image displayed on a TV monitor screen. U.S. Pat. No. 5,371,678 issued on Dec. 6, 1994 exemplifies such a vehicular navigating apparatus as described above.

Such a vehicular navigating apparatus as described above includes: a) a play-back unit for a CD-ROM storing a commercially available electronic road map on the same region of which a large quantity of associated road map information is recorded; b) a plurality of sensors and a receiver for a satellite information to detect the present position of the vehicle; c) a calculation (arithmetic and logic operation) unit used to calculate the own vehicle position, to search the electronic road map, to extract the corresponding road map information, and to perform an image processing on the basis of the extracted road map information; and d) a monitor screen on which the present position of the own vehicle is superimposed on the displayed road map. If the vehicular navigating apparatus is provided with a rewritable recording medium such as a magnetic disc (disk) (floppy disk) or IC memory as the electronic road map in addition to the available (already set) CD-ROM, the navigating apparatus records the information searched from the CD-ROM which is combined with the new information on the added recording medium so as to enable a user to prepare a special purpose minor data base. An example of the special-purpose minor data base includes a technique in which with a running route set by a vehicular driver stored, the set running route is superimposed on the road map displayed on the monitor screen and includes another technique in which the vehicular driver sets a start point at which the vehicle is to start and a destination at which the vehicle is finally to reach and a shortest route from the start point to the destination is automatically searched.

Next, suppose such a running situation that the vehicle once ascends a short slope, thereafter, descends a continued short slope, and again ascends a further continued long slope.

In order to save a fuel consumption, suppress a vehicular compartment noise and vehicular vibration, purify an exhaust gas of the vehicle, and reduce vehicular contaminations, various techniques which automatically adjust operating conditions of either or both of the automotive engine and associated automatic power transmission during the vehicular running have been put into practice.

For example, when a vehicular sensing apparatus detects a high-speed steady-state running (so called, cruise speed run) during the vehicle run on a freeway, the automotive engine is controlled in a high air-fuel mixture ratio mode, namely, in a lean burn control mode and/or a gear range shifting characteristic of the associated automatic power transmission is changed to a higher gear range shifting characteristic mode or lower gear range shifting characteristic mode from a normal gear range shifting mode in order to accommodate to an output condition of the engine.

In these techniques, an optimum operating condition is set to either or both of the engine and associated automatic power transmission which corresponds to an ever-changing present vehicular load situation. When the vehicle starts to ascend the first short slope with the automotive engine in the lean burn control mode, an insufficiency in the engine output is automatically detected so that the lean burn control mode of the air-fuel mixture ratio control is automatically switched to a, so-called, stoichiometric control mode in which the air-fuel mixture ratio control is controlled to make the present air/fuel mixture ratio approach to a stoichiometric air/fuel mixture ratio.

In such a technique that the optimum operating condition of either or both of the engine and automatic power transmission corresponding to the present vehicular load condition is set to either or both of the engine and associated automatic power transmission, a time duration during which the control mode switching is carried out causes a substantial reduction in an automotive driving performance. For example, about two seconds are required from a time at which a signal is input to a fuel supply system of the engine to a time at which the engine output state is actually changed to respond to the control mode change in a case where the switching between the two air-fuel mixture ratio control modes is carried out. In addition, about one second is required from a time at which a gear shift ratio characteristic switching is commanded to the automatic power transmission to a time at which the actual gear shifting is completed to respond to the gear range shifting characteristic. It is noted that in the vehicular run at 100 Km/h, two seconds correspond to the run through 60 m and one second run corresponds to 30 meter run. Therefore, when the vehicle enters an ascending slope having a length shorter than 100 m and the engine air-fuel mixture ratio control mode is switched after the reduction of the engine output is detected, the ascending slope is about to be ended or already ended at a time when the engine output is actually increased. During the run on the ascending slope, the vehicle driver feels that the vehicular speed is gradually reduced even if an accelerator pedal associated with an engine throttle valve is strongly depressed to accelerate the vehicle and feels that the power train of the vehicle itself has an insufficient power and a worsened response of the power train to the depression of the accelerator pedal is resulted even though these situations are caused by the operating condition of the engine to achieve the lower fuel consumption. Hence, if a necessary switching operation is completed before the vehicle enters the ascending slope, the operating condition of the engine to achieve the lower fuel consumption is halted, and the operating conditions such that the engine gives a high power output and gives a highly response characteristic are set, such unfavorable feelings of the vehicle driver as described above can be avoided.

In the technique such that the settings of the operating conditions for the engine and/or automatic power transmission are switched according to the present vehicular load condition, unnecessary switching operations occur in addition to the problem of the substantial control mode switching time duration described above.

As described before, in the case where the vehicle runs on such an ascending slope as described above in which the long ascending slopes are continued with the short descending short slope segment placed between the long ascending slopes. In this case, it has no advantage that the engine air-fuel mixture ratio control mode is switched to the lean burn control mode during the vehicular run on such a short descending slope segment as described above. It is rather than better to avoid carrying out the setting change unnecessary for the engine and/or automatic power transmission, in anticipation of a presence in a change in a road gradient at a forward direction of the vehicle. That is to say, if there is no advantage in switching the settings of the engine and/or automatic power transmission, a high engine output power and a highly responsive characteristic should be assured even if the vehicle receives a minor disadvantage in consuming fuel during the vehicular run on a midway (,i.e., the short descending slope) through the ascending slope. In addition, it is doubtful whether the vehicle can achieve the fuel economy during the run on the short descending slope before the long continued ascending slope, with the length of the substantial time duration during which the control mode switching is carried out taken into consideration.

A Japanese Patent Application First Publication No. Heisei 2-48210 published on Feb. 19, 1990 exemplifies a previously proposed vehicular characteristic switching apparatus in which a vehicular body behavior characteristic is predictively switched so as to accommodate to a forward state far away from the road on which the vehicle is running, utilizing the vehicular navigating apparatus.

In the above-identified Japanese Patent Application First, Publication, while the vehicle driver is driving the vehicle along the set route of travel with the route of travel set before the start of the drive, the CD-ROM road map information is predictively searched on the basis of the present position of the own vehicle specified by the navigating apparatus and an optimum suspension (damping force) characteristic and/or a steering characteristic of the vehicle according to such a road attribute as a slope, freeway, or rough (ragged) road before the vehicle enters such a slope, freeway, or rough road is automatically set.

Hence, if such a technique as the predictive switching method of the vehicular (body) characteristic as disclosed in the above-identified Japanese Patent Application First Publication is expanded, such a technique that the operating condition of either or both of the engine and associated automatic power transmission is predictively (anticipative) switched would be conceivable. That is to say, at a timely varying running position during the vehicular run, the CD-ROM is predictively searched along the driver'set running route and the optimum engine air-fuel mixture ratio characteristic and automatic power transmission gear shifting characteristic, both of which accord with the road attributes such as the slope, freeway, and rugged road, are automatically set before an actual entrance of the vehicle into such the slope, freeway, and rugged road as described above. Then, if the technique of the predictive control for the power train system of the vehicle according to an anticipation of the route of the travel along which the vehicle is to run is combined with the technique of the route search from the CD-ROM, the operating conditions of either or both of the engine and associated automatic power transmission can predictively be switched without setting of the running route of travel before the start of the vehicle disclosed in the above-identified Japanese Patent Application First Publication.

In details, during the vehicular run along the set route of travel, a future position of the own vehicle several seconds later than the present position of the vehicle is estimated at a running position varied with time, a road attribute information at the running position several seconds after the time at which the vehicle is at the present position (such as a gradient, attitude, width, radius of curvature, distinction between paved road or unpaved road, and so forth) is read from the CD-ROM, and the optimum engine air-fuel mixture ratio and gear range shifting characteristic of the automatic power transmission are set according to these road attributes.

However, in this case, it is necessary to give numerical values of tremendous amounts of initial conditions such as a vehicular load weight, a number of vehicular occupants, a kind of fuel used in the engine, surrounding temperature and moisture, wear levels of road wheels, personality of the vehicle driver, and so forth to the engine and/or automatic power transmission as initial conditions. The optimum settings of the engine and/or associated automatic power transmission are largely different according to these initial conditions. Then, if the setting of these initial conditions are rested on the driver's operation, an appropriate management of the initial conditions cannot be expected due to the troublesome in setting the initial conditions. In addition, if various sensors are installed to detect the initial conditions in place of the vehicular driver's settings, the system of setting the operating conditions of the engine and/or automatic power transmission requires a great number of sensors, accessory circuits, and signal processing devices. Consequently, such a system as described above becomes expensive and has a low practicability.

SUMMARY OF THE INVENTION

It is, therefore, a main object of the present invention to provide an apparatus and method for controlling a vehicular driving force utilizing a vehicular navigating system having a high practicability in which a future vehicular running position several seconds after a time at which the present position is estimated to search road attributes at the estimated running position so that the settings of driving characteristics in an automotive engine and/or associated automatic power transmission are optimally and precisely adjusted.

The above-described object can be achieved by providing a control apparatus for an automotive vehicle, comprising: a) electronic road map storing means for storing a road map information, said road map information including at least a gradient information of roads; b) vehicle present position specifying means for specifying a present position of the vehicle; c) running road estimating means for referring to the stored road map information on the basis of a result of specification of the present position of the vehicle by said vehicle present position specifying means so as to derive a present position of the vehicle on the road map information, and for estimating a future position of the vehicle as an estimated position of the vehicle on the basis of the derived present position of the vehicle, said estimated position of the vehicle being the future present position of the vehicle several seconds after a time at which the vehicle is placed at the present position; d) running resistance measuring means for deriving a vehicle load condition imposed on a vehicular driving system at the specified present position of the vehicle; e) driving force predicting means for correcting the present vehicular load condition at the present position of the vehicle so as to derive a required driving force at the estimated position of the vehicle on the basis of the gradient information between the present position of the vehicle and the estimated position of the vehicle searched from the electronic road map storing means; and f) vehicular driving system controlling means for adjusting a setting of a driving characteristic of at least one of a vehicular engine or engine associated automatic power transmission installed in the vehicle driving system in advance in time on the basis of the derived driving force at the estimated position of the vehicle so as to suppress a fuel consumption as low as possible within a range such that the fuel consumption enables the vehicular driving system to exert the required driving force at the estimated position of the vehicle.

The above-described object can also be achieved by providing a control apparatus for an automotive vehicle, comprising: a) electronic road map storing means for storing a road map information, said road map information including at least a gradient information of roads; b) vehicle present position specifying means for specifying a present position of the vehicle; c) running road estimating means for referring to the stored road map information on the basis of a result of specification of the present position of the vehicle by said vehicle present position specifying means so as to derive a present position of the vehicle on the road map information, and for estimating a future position of the vehicle as an estimated position of the vehicle on the basis of the derived present position of the vehicle, said estimated position of the vehicle being the future present position of the vehicle several seconds after the vehicle is placed at the present position; d) vehicular running resistance measuring means for deriving a vehicle load condition imposed on a vehicular driving system at the specified present position of the vehicle; e) driving force predicting means for correcting the present vehicular load condition at the present position of the vehicle so as to derive a required driving force at the estimated position of the vehicle on the basis of the gradient information between the present position of the vehicle and the estimated position of the vehicle searched from the electronic road map storing means; f) driving system controlling means for adjusting a setting of a driving characteristic of at least one of a vehicular engine or engine associated automatic power transmission installed in the vehicle driving system in advance in time on the basis of the derived driving force at the estimated position of the vehicle so as to suppress a fuel consumption as low as possible within a range such that the fuel consumption enables the vehicular driving system to exert the required driving force at the estimated position of the vehicle; and g) target point inputting means for inputting and setting a target position of the vehicle on a route of travel to which the vehicle is to reach through said target point inputting means by an operator in connection with the road map information, and wherein said running road estimating means comprises moving means for moving the estimated position of the vehicle along a road branched from a branching point and having a relatively high directional tendency toward the set target position of the route of travel in a case where the estimated position of the vehicle is placed so as to jump over the branching point with respect to the present position of the vehicle.

The above-described object can also be achieved by providing a control apparatus for an automotive vehicle comprising: a) electronic road map storing means for storing a road map information, said road map information including at least a gradient information of roads; b) vehicle present position specifying means for specifying a present position of the vehicle; c) running road estimating means for referring to the stored road map information on the basis of a result of specification of the present position of the vehicle by said vehicle present position specifying means so as to derive a present position of the vehicle on the road map information, and for estimating a future position of the vehicle as an estimated position of the vehicle on the basis of the derived present position of the vehicle, said estimated position of the vehicle being the future present position of the vehicle several seconds after a time at which the vehicle is placed at the present position; d) running resistance measuring means for deriving a vehicle load condition imposed on a vehicular driving system at, the specified present position of the vehicle; e) driving force predicting means for correcting the present vehicular load condition at the present position of the vehicle so as to derive a required driving force at the estimated position of the vehicle on the basis of the gradient information between the present position of the vehicle and the estimated position of the vehicle searched from the electronic road map storing means; and f) driving system controlling means for adjusting a setting of a driving characteristic of at least one of a vehicular engine or engine associated automatic power transmission installed in the vehicle driving system in advance on the basis of the derived driving force at the estimated position of the vehicle so as to suppress a fuel consumption as low as possible within a range such that the fuel consumption enables the vehicular driving system to exert the required driving force at the estimated position of the vehicle, and wherein said running road estimating means further comprises forward direction identifying means for detecting an operation content of the vehicular driver corresponding to a forward direction of the vehicle and identifying the forward direction of the vehicle at a road branching point and estimated position moving means for moving the estimated position along a branched road corresponding to the forward direction of the vehicle identified by said forward direction identifying means when the estimated position of the vehicle is placed so as to jump over the road branching point.

The above-described object can also be achieved by providing a control apparatus for an automotive vehicle comprising: a) electronic road map storing means for storing a road map information, said road map information including at least a gradient information of roads, said electronic road map storing means being arranged so as to be rewritable therein on a new information at each point on a running route of travel of the vehicle in relation to the road map information; b) vehicle present position specifying means for specifying a present position of the vehicle; c) running road estimating means for referring to the stored road map information on the basis of a result of specification of the present position of the vehicle by said vehicle present position specifying means so as to derive a present position of the vehicle on the road map information, and for estimating a future position of the vehicle as an estimated position of the vehicle on the basis of the derived present position of the vehicle, said estimated position of the vehicle being the future present position of the vehicle several seconds after a time at which the vehicle is placed at the present position; d) running resistance measuring means for deriving a vehicle load condition imposed on a vehicular driving system at the specified present position of the vehicle; e) driving force predicting means for correcting the present vehicular load condition at the present position of the vehicle so as to derive a required driving force at the estimated position of the vehicle on the basis of the gradient information between the present position of the vehicle and the estimated position of the vehicle searched from the electronic road map storing means; f) driving system controlling means for adjusting a setting of a driving characteristic of at least one of a vehicular engine or engine associated automatic power transmission installed in the vehicle driving system in advance in time on the basis of the derived driving force at the estimated position of the vehicle so as to suppress a fuel consumption as low as possible within a range such that the fuel consumption enables the vehicular driving system to exert the required driving force at the estimated position of the vehicle; and g) running locus recording means for detecting an ever-changing information related to the driving force generated by the vehicle during the run of the vehicle and for storing and recording the detected ever-changing information related to the driving force generated by the vehicle on said rewritable electronic road map storing means, and wherein said driving system controlling means comprises correcting means for correcting a content of adjustment in anticipation according to the required driving force on the basis of the past ever-changing information related to the driving force generated by the vehicle at the estimated position of the vehicle searched from the rewritable electronic road map storing means.

The above-described object can also be achieved by providing a control apparatus for an automotive vehicle comprising: a) electronic road map storing means for storing a road map information, said road map information including at least a gradient information of roads, said electronic road map storing means being arranged so as to be rewritable therein on a new information at each point on a running route of travel of the vehicle in relation to the road map information; b) vehicle present position specifying means for specifying a present position of the vehicle; c) running road estimating means for referring to the stored road map information on the basis of a result of specification of the present position of the vehicle by said vehicle present position specifying means so as to derive a present position of the vehicle on the road map information, and for estimating a future position of the vehicle as an estimated position of the vehicle on the basis of the derived present position of the vehicle, said estimated position of the vehicle being the future present position of the vehicle several seconds after a time at which the vehicle is placed at the present position; d) running resistance measuring means for deriving a vehicle load condition imposed on a vehicular driving system at the specified present position of the vehicle; e) driving force predicting means for correcting the present vehicular load condition at the present position of the vehicle so as to derive a required driving force at the estimated position of the vehicle on the basis of the gradient information between the present position of the vehicle and the estimated position of the vehicle searched from the electronic road map storing means; f) driving system controlling means for adjusting a setting of a driving characteristic of at least one of a vehicular engine or engine associated automatic power transmission installed in the vehicle driving system in advance in time on the basis of the derived driving force at the estimated position of the vehicle so as to suppress a fuel consumption as low as possible within a range such that the fuel consumption enables the vehicular driving system to exert the required driving force at the estimated position of the vehicle; g) generated driving force deriving means for deriving an ever-changing driving force output state of the vehicle during the run of She vehicle; and h) evaluating means for deriving a numerical value related to a gap between the required driving force at the estimated position of the vehicle and an actual driving force output state at the estimated position of the vehicle derived by the generated driving force deriving means and storing and recording the derived numerical value on said rewritable electronic road map storing means, and wherein said driving system controlling means comprises correcting means for correcting a content of an adjustment in anticipation according to the past numerical value related to said gap searched from said rewritable electronic road map storing means.

The above-described object can also be achieved by providing a control apparatus for an automotive vehicle comprising: a) electronic road map storing means for storing a road map information, said road map information including at least a gradient information of roads; b) vehicle present position specifying means for specifying a present position of the vehicle; c) running road estimating means for referring to the stored road map information on the basis of a result of specification of the present position of the vehicle by said vehicle present position specifying means so as to derive a present position of the vehicle on the road map information, and for estimating a future position of the vehicle as an estimated position of the vehicle on the basis of the derived present position of the vehicle, said estimated position of the vehicle being the future present position of the vehicle several seconds after a time at which the vehicle is placed at the present position; d) running resistance measuring means for deriving a vehicle load condition imposed on a vehicular driving system at the specified present position of the vehicle; e) driving force predicting means for correcting the present vehicular load condition at the present position of the vehicle so as to derive a required driving force at the estimated position of the vehicle on the basis of the gradient information between the present position of the vehicle and the estimated position of the vehicle searched from the electronic road map storing means; f) driving system controlling means for adjusting a setting of a driving characteristic of at least one of a vehicular engine or engine associated automatic power transmission installed in the vehicle driving system in advance on the basis of the derived driving force at the estimated position of the vehicle so as to suppress a fuel consumption as low as possible within a range such that the fuel consumption enables the vehicular driving system to exert the required driving force at the estimated position of the vehicle; and g) vehicular driver operation intention detecting means for detecting an ever-changing operating variable of an engine throttle valve of the vehicle by a vehicular driver during the run of the vehicle so as to determine a variation of a driving pattern of the vehicular driver, and wherein said driving system controlling means comprises correcting means for correcting a content of the adjustment in advance of the setting so as to relieve the suppression of the fuel consumption when a variation width in the operating variable of the engine throttle valve detected by the vehicular driver operation intention detecting means is expanded.

The above-described object can also be achieved by providing a method for controlling a driving force exerted by an automotive vehicle, comprising the steps of: a) storing a road map information, said road map information including at least a gradient information of roads; b) specifying a present position of the vehicle using a GPS receiving system; c) referring to the stored road map information on the basis of a result of specification of the present position of the vehicle at the step b) so as to derive a present position of the vehicle on the road map information, and estimating a future position of the vehicle as an estimated position of the vehicle or the basis of the derived present position of the vehicle, said estimated position of the vehicle being the future present position of the vehicle several seconds after a time at which the vehicle is placed at the present position; d) deriving a vehicle load condition imposed on a vehicular driving system at the specified present position of the vehicle; e) correcting the present vehicular load condition at the present position of the vehicle so as to derive a required driving force at the estimated position of the vehicle on the basis of the gradient information between the present position of the vehicle and the estimated position of the vehicle searched from the step a); and f) adjusting a setting of a driving characteristic of at least one of a vehicular engine or engine associated automatic power transmission installed in a vehicle driving system in advance on the basis of the derived driving force at the estimated position of the vehicle so as to suppress a fuel consumption as low as possible within a range such that the fuel consumption enables the vehicular driving system to exert the required driving force at the estimated position of the vehicle.

In the vehicular driving force controlling apparatus according to the present invention, the electronic road map, the own vehicle position specifying means, and running road estimating means constitute a navigating system. The electronic road map includes at least gradient information for each point of place on the road segments as an attribute information on the road map information. The gradient information includes a height (land height) information by which the gradient of the running road segment can indirectly be identified. The position detecting means is constituted by a combination of a gyro sensor (gyroscope) and a running distance sensor or GPS (Global Positioning System) satellite broadcasting receiver. The running road estimating means executes an estimation operation for the future vehicular position several second after the present position on the basis of the derived present position of the vehicle in addition to the specification operation of the present vehicular position in the same way as the well known navigating system executes. The driving force predicting means executes a relative correction for the driving force according to a gradient difference between the present position and the estimated position on the basis of actual driving system load condition and driving force output condition of the vehicle itself at the present position of the vehicle. Therefore, it is not necessary to search for the equal variables between the present position and the estimated position such as the quantity of cargo mounted on the vehicle (vehicle load weight), the number of vehicular occupants, road wheel condition, running road surface condition, and so forth so that an accurate estimation of a required driving force becomes possible even if the above-described variables are unknown. The driving system controlling means optimizes an engine air-fuel mixture ratio and/or gear range shifting characteristic of the automatic power transmission according to the load condition at the estimated position (which is replacable with an average value or a maximum value of the load condition at an interval of distance from the present position to the estimated position) which is relatively derived by the driving force predicting means from the anticipated information. The optimization means the achievement of improvement in the fuel economy, purification of exhaust gas, and so forth avoiding unnecessary switching operations in a range for the vehicular driver not to feel the insufficiency of driving power and the worsening in acceleration command responsive characteristic. It is noted that the estimated position means a point of place through which the vehicle is to pass several seconds after the vehicle has run through the present position. It is also noted that the several seconds after the vehicle has run through the present position means a time duration equal to or more than a delay time (time lag) from a time at which the signal to indicate the setting change for the engine and/or automatic power transmission of the vehicle is input to a time at which the result of setting change is actually reflected on the output of the driving system (driving power train) of the vehicle. Hence, the interval of distance between the present position and the estimated position may be varied according to the instantaneous vehicle running speed. The required driving force at the estimated position may be corrected according to such an information as a kind of road (freeway or national roadway), radius of curvature, and so forth searched from the electronic road map in addition to the gradient difference between the present position and estimated position. The running road estimating means, the running resistance measuring means, the driving force predicting means, driving system controlling means correspond to the processing of data calculations, comparison, and determination so that it is possible for theses means to correspond to a part of program to be executed by one or more arithmetic operation units including a memory unit in the practical manner.

BEST MODE FOR CARRYING OUT THE INVENTION

Reference will hereinafter be made to the drawings in order to facilitate a better understanding of the present invention.

(First Embodiment)

Figure 1:
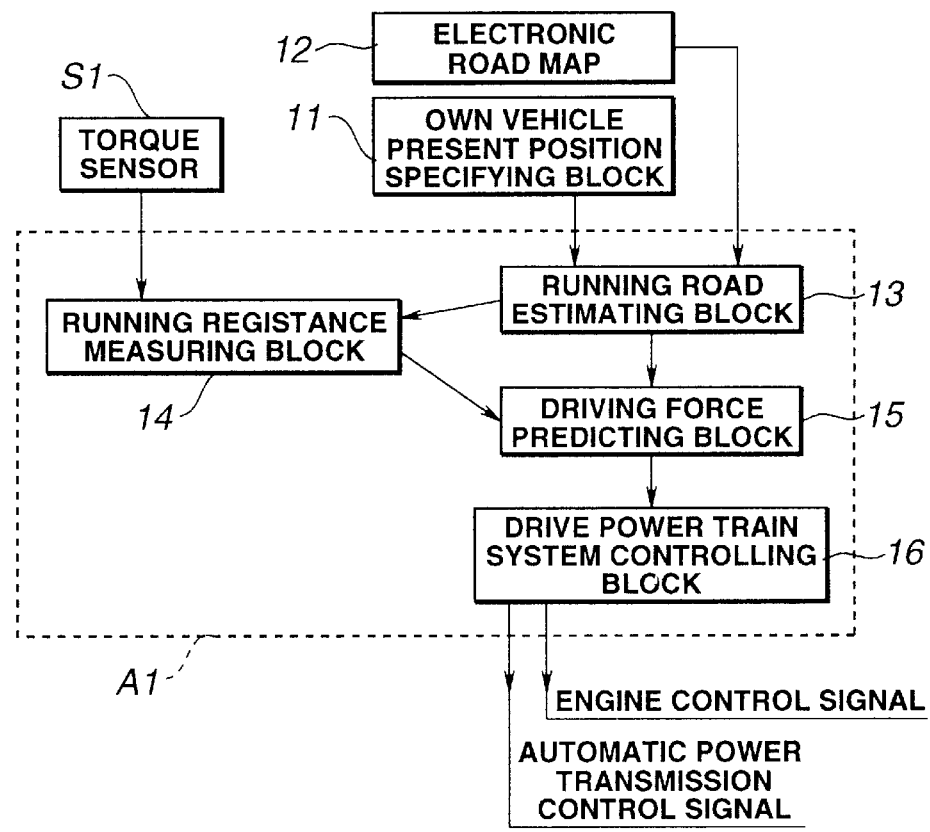
FIG. 1 is a functional block diagram of a vehicular driving force controlling apparatus in a first preferred embodiment according to the present invention.
Figure 2:
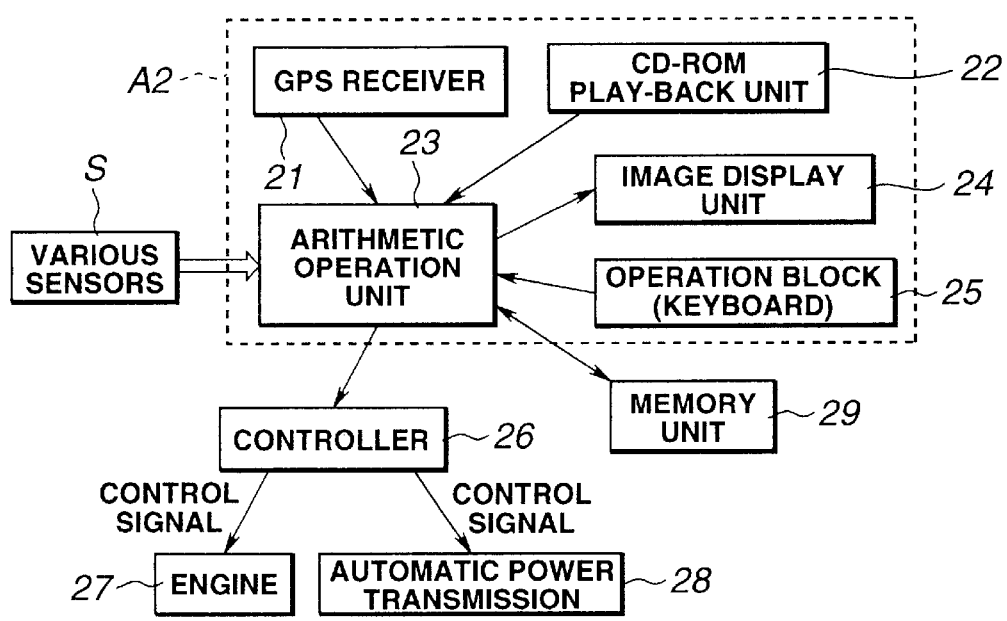
FIG. 2 is a circuit block diagram of a vehicular driving force controlling apparatus in the first preferred embodiment according to the present invention.

FIG. 1 and FIG. 2 show integrally a schematic functional block diagram of a vehicular driving force controlling apparatus in a first preferred embodiment according to the present invention.

Figure 3A:
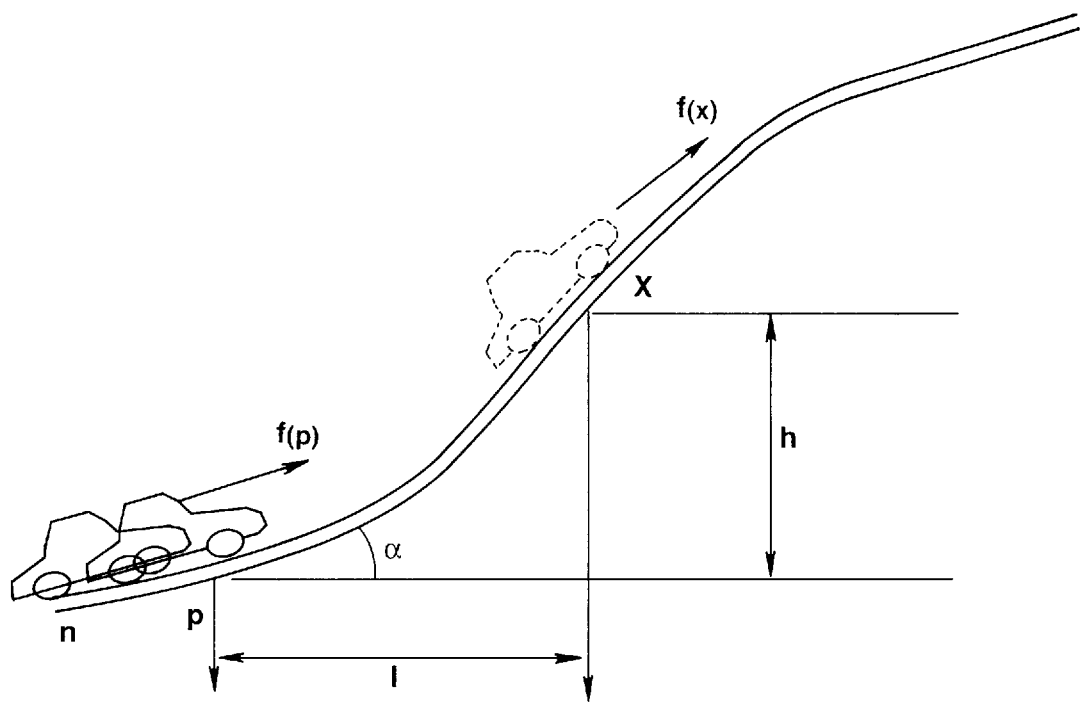
FIG. 3A is an explanatory view for explaining a road situation of a vehicular run on a slope in the case of the vehicular driving force controlling apparatus in the first embodiment.
Figure 3B:
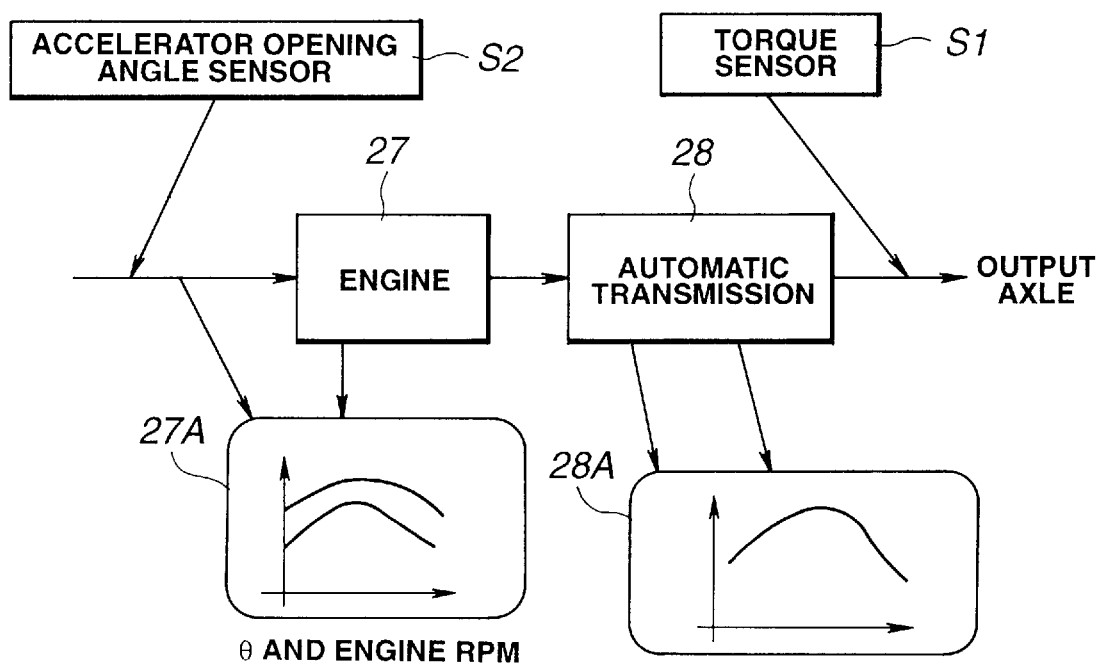
FIG. 3B is an explanatory view for explaining control contents of the vehicular driving force controlling apparatus in the first embodiment.

FIGS. 3A and 3B show explanatory views for explaining a prediction processing of the vehicular driving force executed in the first embodiment.

Figure 4:
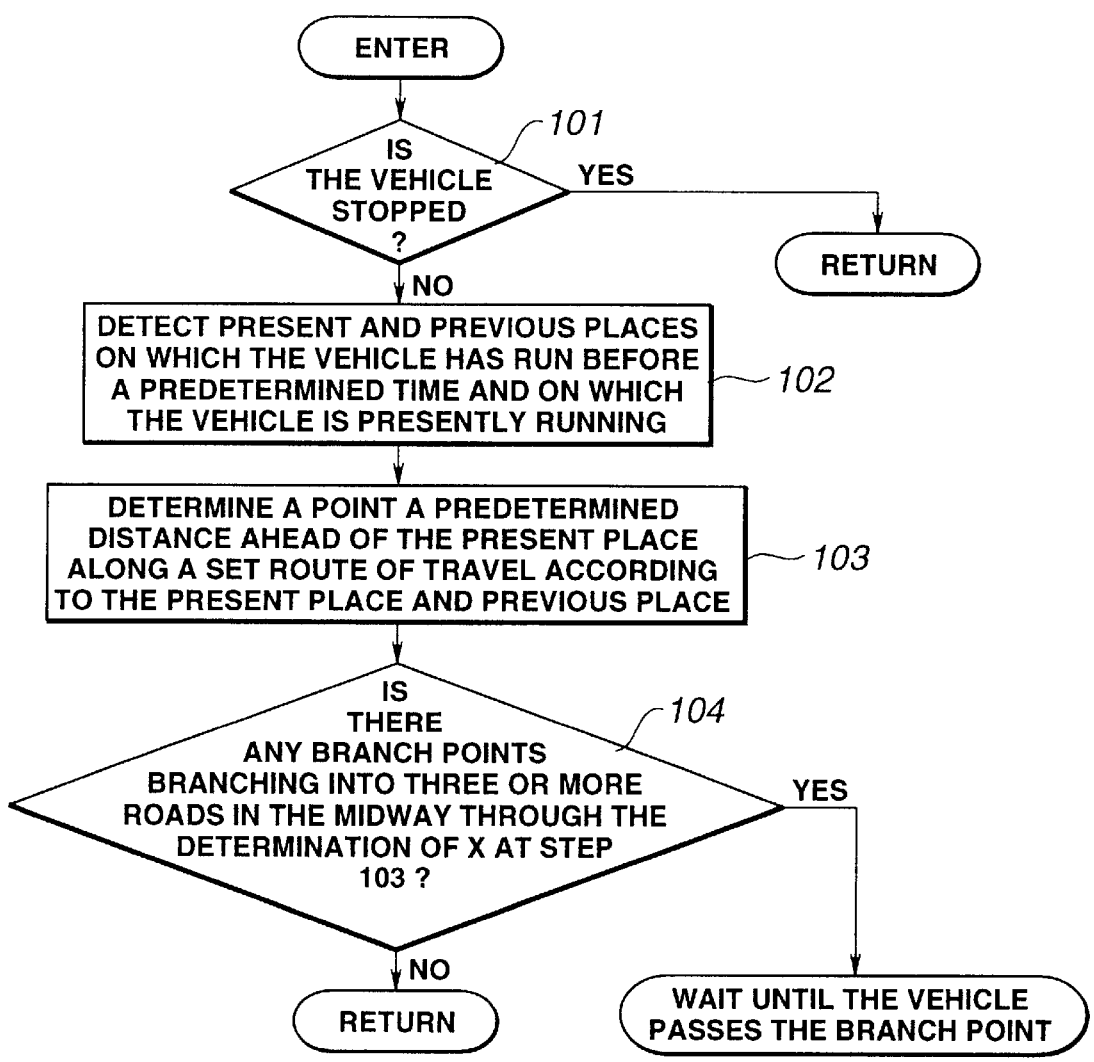
FIG. 4 is a processing flowchart of determination in anticipation of distance to an estimated road point executed in a running road estimating block of the vehicular driving force controlling apparatus in the first embodiment.

FIG. 4 shows an explanatory flowchart for explaining a determination of an anticipation of distance executed in the first embodiment.

Figure 5:
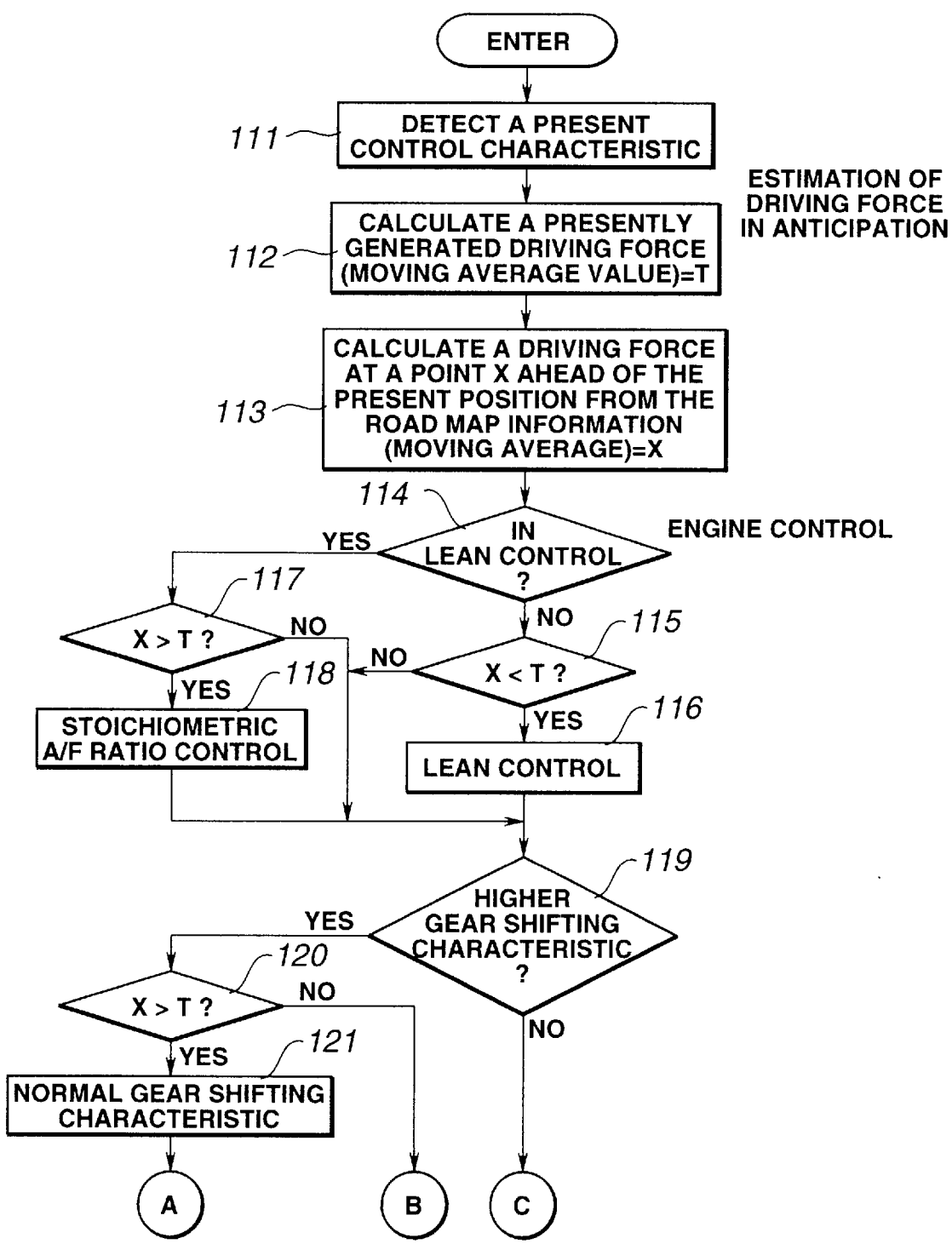
FIGS. 5 and 6 are integrally a driving force controlling flowchart executed in the first embodiment shown in FIGS. 1 and 2.
Figure 6:
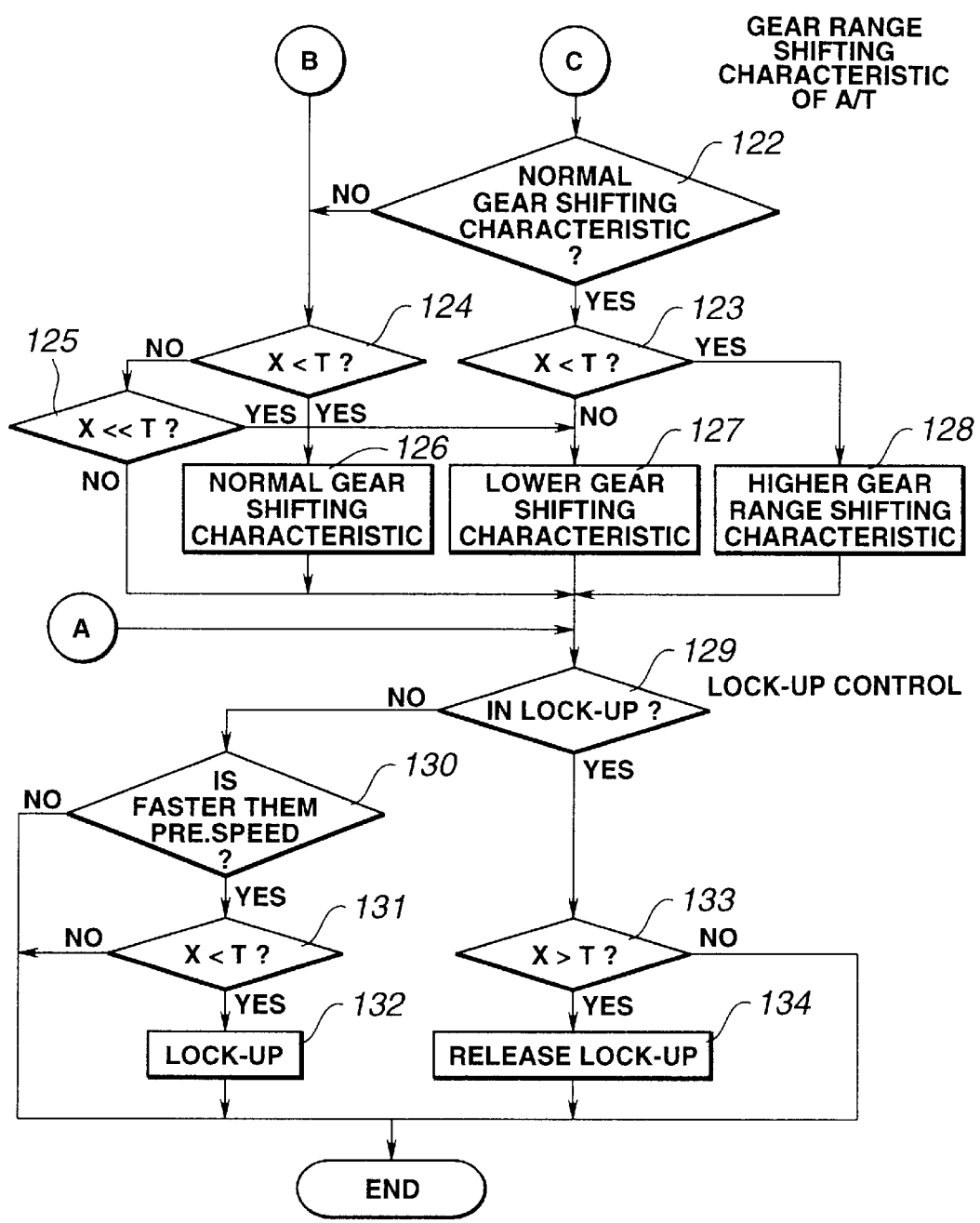

FIGS. 5 and 6 integrally show an operational flowchart for a driving force control processing executed in the first embodiment.

Figure 7:
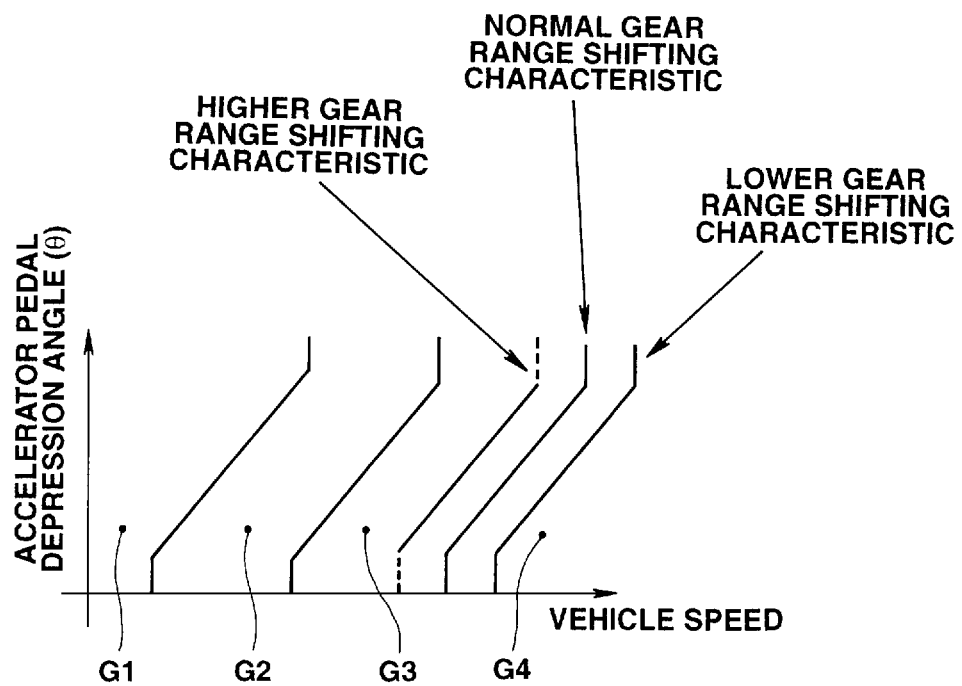
FIG. 7 is an explanatory view for explaining the switchings between, a lower gear range shifting, a normal gear range shifting, and a higher gear range shifting characteristics.

FIG. 7 shows an explanatory view for explaining a gear range shifting characteristic change in a normal fluid coupling (gear range shifting type) variable automatic power transmission to which the present invention is applicable.

It is noted that FIG. 3A shows a relationship between a gradient of a road and a driving force exerted by the vehicle and FIG. 3B shows the content of control executed in the first embodiment.

In the first embodiment, the present driving force exerted by the vehicle is corrected according to a gradient difference between an estimated position defined as a passage point through which the vehicle is to pass several seconds after the time at which the vehicle is at the present position of the vehicle.

As described above, FIG. 1 shows the functional block diagram of the vehicular driving force controlling apparatus utilizing a vehicular navigating system in the first embodiment and FIG. 2 shows the individual circuit block diagram version of the first embodiment of the vehicular driving force controlling apparatus shown in FIG. 1.

In FIG. 1, an own vehicle position specifying block 11 (the won vehicle means a vehicle in which the driving force controlling apparatus according to the present invention is mounted and in operation) outputs a signal indicating the specification of the position of the own vehicle in a format not related to a road map, the specified position indicating a position coordinate of a latitude and a longitude on the Earth, a direction and distance of the present position from a specific point of location. An electronic road map 12 stores a data formatted road map and various types of information searchable for each location of roads including at least a road gradient (height) information therefrom.

A running road estimating block 13 searches the electronic road map 12 using the own vehicle position derived from the own vehicle position specifying block 11 for a running road on the road map stored in the electronic road map 12 and for the present position of the own vehicle on the running road. In addition, the running road estimating block 13 derives an estimated position of the own vehicle several seconds after the present position of the own vehicle which is several ten meters through one hundred meters ahead of the present position in the vehicular forwarding direction. The running road estimating block 13 retrieves various information related to an interval from the present position to this future position from the electronic road map 12 and holds the various information so as to be enabled to be transmitted to a running resistance measuring block 14 and a driving force predicting block 15.

The running resistance measuring block 14 calculates the present running resistance of the own vehicle from an output signal of a torque sensor S1 (as will be described later), referring to the information read from the running road estimating block 13.

The driving force predicting block 15 corrects a value of the present running resistance of the own vehicle derived by the running resistance measuring block 14 on the basis of the input information from the running road estimating block 14 so as to estimate a required driving force at the estimated position (or the interval of distance from the present position to the estimated position) placed several ten meters or one hundred meter ahead. The driving force control block 16 sets operating variables of a vehicular engine and/or automatic power transmission in a vehicular driving system on the basis of a level of the required driving force estimated on the basis of the previously read information. It is noted that a block denoted in a broken line and denoted by A1 carries out an arithmetic operation processing section.

On the other hand, in FIG. 2, a block denoted in the broken line and denoted by A2 is constituted by a, so-called, a navigating apparatus.

A GPS receiver 21 specifies the latitude and longitude that the vehicle occupies on the Earth by receiving GPS satellite electric waves transmitted from satellites. The GPS receiver 21 is exemplified by U.S. Pat. Nos. 4,899,285 issued on Feb. 6, 1990 and 4,743,913, the disclosures of which are herein incorporated by reference.

A CD-ROM play-back unit (or CD-ROM driver) 22 searches a CD-ROM (Compact Disc Read Only Memory) inserted into the CD-ROM play-back unit on the basis of an input search signal and outputs a searched information from the CD-ROM. The CD-ROM is recorded with image data on the road map having a plurality of stages of scale reduction percentages with a constant regional area, road data related to roads on the map on which the vehicle can run, and accessory information related to each point of the roads.

The accessory information includes gradients or heights of the roads with respect to, for example, sea level. A image display unit 24 outputs a navigation image synthesized with a CAD (Computer Aided Design) image prepared by an arithmetic operation unit (including a microprocessor) 23 itself and road map image transferred from the CD-ROM for the vehicular driver. An operation block 25 includes a keyboard, finger touch sensors virtually imaged on an image screen of the image display unit 24, and various kinds of switches. The operation block 25 can be used to set a navigating destination (a target location) to which the vehicle is finally to reach in advance of a driving start of the vehicle therethrough.

The arithmetic operation unit 23 converts the input signals thereinto, calculates a predetermined series of operations, and communicates with peripheral devices in accordance with predetermined processing programs and performs a total control over the peripheral devices and various sensors S so as to achieve a predetermined system function. It is noted that the arithmetic operation unit 23 includes a signal processing circuitry which numerically converts the input signals using A/D (Analog-to-Digital) converters and counters. As far as the normal navigation function is concerned, the arithmetic operation unit 23 searches the CD-ROM play-back unit 22 using the own vehicle position date specified by the GPS (Global Positioning System) receiver 21 so as to read out the road data and accessory information together with the required road map image. The arithmetic operation unit 23 forms the CAD image representing a running locus (a trajectory along which the vehicle has run) and the position of the own vehicle on the basis of such data or information as described above.

It is noted that the electronic road map 12 shown in FIG. 1 includes a combination of both CD-ROM play-back unit 22 and a memory unit 29.

It is also noted that the own vehicle position specifying block 11 corresponds to the GPS receiver 21. The GPS receiver 21 is exemplified by U.S. Pat. Nos. 4,899,285 issued on Feb. 6, 1990 and 4,743,913 issued on May 10, 1988, the disclosures of which is herein incorporated by reference.

A part A1 enclosed by the broken line of FIG. 1 corresponds to a driving force control program in terms of the software which is an interrupt program in a navigation processing routine as will be described later.

A controller 26 outputs command signals to change the present settings of driving characteristics of both a vehicular engine (internal combustion engine) 27 and its associated torque converter equipped automatic power transmission 28 on the basis of contents of control signals, i.e., an engine control signal and an automatic power transmission control signal derived from the driving system (power train) controlling block 16.

In FIG. 2, various sensors S include the torque sensor S1 shown in FIG. 1 whose output signal is used in the driving force control program. The memory unit 29 includes a magnetic disc recording/play-back unit and an IC memory unit. The memory unit 29 an ever-changing information searched by the running road estimating block 13 from the CD-ROM in relation to the road data. In addition, the memory unit 29 integrally records the road data related to a set route of travel and accessory information into its memory area, both of which are searched from the CD-ROM play-back unit 22. The memory unit 29 can also additionally record data derived from the various sensors S and other arithmetic data during the vehicular run as accessory information thereinto.

Next, in FIG. 3A, in the first embodiment, at the present position P of the own vehicle at which the driving force f(P) is actually exerted, the driving force f(x) at the forward position x at which the vehicle is to pass several seconds after the present position P is estimated. The setting changes according to the estimated driving force f(x) are carried out for the engine 27 and automatic power transmission 28.

The running road estimating block 13 determines a present running direction from a past running locus (trajectory) derived by the navigating system and estimates a position x to which the determined running direction is extended about 100 meter ahead of the present position P along the route of travel. The driving force predicting block 15 corrects the actually exerted driving force f(P) at the position P using a gradient difference h between the gradients of the present position P and the estimated position x so as to estimate q required driving force f(x) at the estimated position x. The driving system controlling block 16 sets the engine 27 and automatic power transmission 28 via the controller 26 so as to suppress a fuel consumption in a rage capable of securing the required driving force f(x). The height h(P) at the position P and a height difference h(x) between the position x and the present position P are derived from the heights searched from the road data on the position P and position x from the electronic road map 12. It is noted that the electronic road map 12 also records the height h(n) at a position n placed before the present position P by a distance α.

As shown in FIG. 3B, the driving force f(P) at the present position P can directly be measured using the torque sensor S1 disposed on an output axle of the automatic power transmission 28. The structure of the torque sensor S1 is exemplified by a U.S. Pat. No. 5,419,207 issued on May 30, 1995, the disclosure of which is herein incorporated by reference.

A torque on an engine output axle may be derived by referring to an engine driving characteristic map 27A according to an opening angle of an engine throttle valve detected by an acceleration opening angle sensor S2 and an engine revolution speed and a transmission torque may be derived by referring to a torque converter characteristic map 28A according to an input revolution speed of the torque converter and an output revolution speed thereof of the torque converter of the automatic power transmission 28. The accelerator opening angle sensor S2 detects an revolved angle of an engine throttle valve and is different from an accelerator sensor S7 as will be described later.

Anyway, suppose that the driving force f(P) has been exerted at an interval of distance from the position n to the position P, the driving force f(x) at the position x several seconds later can be derived using the following technique.

The running resistance of the vehicle is a sum of a rolling resistance Rr, an aerial resistance Ra, and an acceleration resistance Rc. In the first embodiment, the required driving force f(x) several seconds after the present position P is derived by a correction of the present position driving force f(P) by a value corresponding to a gap (differential) of the ascending slope Re supposing that the summed running resistances listed below except the ascending slope resistance Re do not vary at the present position position P and and even at the estimated position x. In details, since the rolling resistance Rr is a resistance related to a total weight of the vehicle, the rolling resistance does not vary from that at the position P even to that at the estimated position x. Even if instantaneous increase and decrease in the operating variable of the throttle valve are present, the same acceleration is deemed to be executed if the acceleration variation for a long period of time is averaged. Hence, the acceleration resistance Rc does not vary from the present position P and position x. Especially, the acceleration resistance Rc does not vary from that at the position P and that at the position x. Especially, if the speed is constant, the acceleration resistance Rc is zero.

If an inclination angle of the ascending slope is α, the ascending slope resistance Re to lift the own vehicle is a value of the total weight W multiplied by sinα. During the run of the vehicle on the slop having the inclination angle of α, suppose that the height by the height h with respect to the sea level is varied for a horizontal distance of 1. When the angle α is small, sinα can be approximate to h/1. Hence, the ascending slope resistance Re is expressed as: Re=Wh/1.

The running resistance R(P) at the present position of the vehicle P becomes coincident with the driving force f(P) supposing that the vehicle runs at the cruise sped (the vehicle speed is constant) so that the acceleration resistance Rc gives zero.

$$f(P)=R(P)=Rr(P)+Ra(P)+Re(P) \qquad (1).$$

Similarly, the running resistance R(x) at the estimated position x several seconds after the present position becomes coincident with the required driving force f(x).

$$f(P)=R(P)=Rr(P)+Ra(x)+Re(x) \qquad (2).$$

Since Rr(P)=Rr(x)=constant and Ra(P)=Ra(x)=constant, the required driving force f(x) is derived from the equations (1) and (2).

$$f(x)=f(P)+[Re(x)-Re(P)] \qquad (3).$$

Suppose that $[Re(x)-Re(P)]=k \cdot H(x)$.

It is noted that k denotes a constant representing the driving force required to lift the total weight W of the vehicle by a unit of height and is derived from the driving force obtained according to an engine driving force map (map with respect to the engine revolution speed and accelerator opening angle). It is also noted that H(x) denotes a height difference from the position P to the position x. Consequently, the equation (3) gives $f(x)=f(P)+k \cdot H(x)$ so that the required driving force can simply be derived from the measurable output value f(P) at the present position P and the height difference H(x) derived according to the searched information through the CD-ROM play-back unit 32.

The required driving force f(x) is different depending upon how far is the estimated position x away from the present position P, i.e., the distance between the present position and the estimated position. The reason that a control target f(x) of the driving force is set in an anticipation read of the electronic road map 12 is that it takes a time to operate the switching of the settings of the engine driving characteristic and automatic power transmission and it is not in time to perform the switchings at a time when the future situation has be noticed. For example, in a case where the switching from a lean control mode to a stoichiometric control mode as a lean burn condition is carried out, it takes about two seconds. In a case where to perform the switching of the gear range shifting characteristic of the torque converter equipped stepwise gear range shifting automatic power transmission about one second is required. Hence, if the required setting changes are started with the driving force f(x) at the estimated position x about two second ahead of the present position P, the anticipation control is achieved so that the vehicular driver is not aware of a delay in control. In a case where the vehicle runs at a speed of 100 km/h, the estimated position x is 30 through 60 meters ahead of the present position since the vehicle runs about 30 seconds per second. In the anticipation control anticipating a temporary halt at an intersection or at a signal, it is convenient to be enabled to anticipate 100 meter through 200 meter ahead. If the temporary halt at the forward direction is assured, the engine can be in the lean control mode and the automatic power transmission gear range shift can be inhibited since the vehicle can be predicted to move in an inertial run.

It is necessary to vary the estimated position depending on a running environment or driving pattern. For example, in a case where a variation in the running speed is hard (violent), the distance (time) in the anticipation of the estimated position is shortened and in a case where the variation in the running speed is minor, the distance (time) in the anticipation of the estimated position is elongated. In addition, when the vehicle approaches the intersection and which of a branched direction from the intersection the vehicle is to be forwarded is not determined, an anticipation control after the intersection is temporarily halted until the vehicle is to pass through the intersection.

FIG. 4 shows a flowchart for explaining the anticipation control processing when the vehicle is to pass through the traffic intersection as described above.

As shown in FIG. 4, the program determines whether the vehicle is running at a step 101. If No at the step 101, the routine goes to a step 102 in which the program specifies the road on which the vehicle is running and the forward direction. At a step 103, the program determines the position ahead of the present position along the road.

At a step 104, the position x which has exceeded or jumped over the intersection from the present position P is not estimated until the present position P can be defined as a road of one of the branched roads on the intersection with the present position P passed through the intersection.

However, basically, as the distance (time) in anticipation requires longer, is becomes easier for the control to utilize the longer distance (time). Here, the driving force f(x) are estimated for estimated positions of x per 10 meters over a range 100 meter ahead of the present position P and an average value or maximum value of ten driving forces f(x) provides a target driving force at an interval of distance of 100 meters.

It is noted that the driving force f(x) and f(P) are treated as instantaneous values, respectively.

However, if the values of f(x) and f(P) are varied for the respective sampling periods, the control targets are instantaneously switched and a driveability of the vehicle may, in turn, be worsened. From these respects, the driving force f(x) or f(P) may be replaced with the driving force F(X) and F(P) derived using a moving average. For example, a moving average F(P) (n=arbitrary natural number) is defined as:

F(P)=((n−1)×F(P−δ)+f(P))/n so that an instantaneous variation component is eliminated. In this way, if the required driving force f(x) or its moving average F(x) at the interval of distance up to the point x or its moving average F(X) is derived, the driving system controlling block 16 determines how the engine and automatic power transmission are controlled in order to achieve the driving force f(x).

The driving system controlling block 16 controls the air/fuel mixture ratio of the engine 27, the gear range shifting characteristic of the automatic power transmission 28, and a lock-up of the torque converter in accordance with the flowcharts of FIGS. 5 and 6 via the controller 26 shown in FIG. 2.

The controller 26 controls the air/fuel mixture ratio of the engine 27 and either of a lean control having a large air/fuel mixture ratio or a stoichiometric control defined to be in a stoichiometric air/fuel mixture ratio is selectable.

FIG. 7 shows a gear range shifting characteristic in the associated automatic power transmission having the torque converter and a lock-up control. As shown in FIG. 7, the switching timings are shown in which a first speed range G1, a second speed range G2, a fourth speed range G4 are provided in its order with respect to the vehicle velocity. It is noted that a timing at which the gear shift is transferred from the third gear shifting range G3 to the fourth gear shifting range G4 is selectable from three modes, namely, a high-geared characteristic, a normal characteristic, and a low-geared characteristic. The high-geared characteristic is such that a gear of a lower gear shift ratio is switched before the opening angle of the accelerator (throttle valve) becomes large and an automatic gear shift is executed having a higher priority of the suppression of the engine revolution speed than the engine output power. On the other hand, the lower geared characteristic is such that a higher gear shift ratio is used until the engine revolution speed is considerably high and, thus, a horse power (engine output power can be taken out. The normal characteristic gives an intermediate characteristic of both higher geared and lower geared characteristics.

In addition, when the torque converter is locked up, a torque transmission efficiency is enhanced but a torque amplification action of the a torque converter during a high load is lost. If the lock-up is released, the torque amplification action is functioned, thus the power during the high load condition is increased. It is noted that a signal indicating the release of the lock-up or indicating the engagement of the lock-up is commanded in addition to a setting signal of the switching of the gear shift range characteristics (lower-geared, normal, or higher-geared) is transmitted from the controller 26 to the automatic power transmission 28. It is noted that the engine 27 and automatic power transmission 28 have at least one control unit to receive the signals from the controller 26.

The series of processing executed by the driving system controlling block 16 will be described with reference to FIGS. 5 and 6.

In the flowchart shown in FIGS. 5 and 6, the driving force derived as the moving average calculation is used. However, the moving averaged driving force can be replaced with a simply averaged value of the instantaneous driving forces, the maximum value of the instantaneous driving forces, and the driving force at one anticipated point of road.

First, at a step 111, the driving system controlling block 16 (constituted by a CPU and hereinafter called CPU) determines the present control mode of either the lean control mode or the stoichiometric control, the present gear range shifting characteristic of any one of the lower-geared characteristic, the normal characteristic, or the higher-geared characteristic, and whether the torque converter is in the locked-up (engaged) state.

At steps of 112 and 113, the CPU calculates the moving average value of the presently generated driving force (hereinbelow, called a generated driving force T) and calculates a moving average of an estimated driving force (hereinbelow, called estimated driving force X) at the interval of distance ahead of the present position from the generated driving force T and a plurality of road gradient data with the present position P and the plurality of gradient data searched on the basis of the plurality of estimated positions x within the forward interval of distance from the CD-ROM (electronic road map 12).

Up to these steps of 112 and 113, the estimated driving force X does not include the driving force margin according to the kinds of roads and according to the different vehicular driver.

At a step S114, the routine goes to a step 117 in the case where the engine 37 is in the lean control (Yes). In the case where the engine 37 is in the stoichiometric control mode (No), the routine goes to a step 115.

If the CPU determines that the estimated driving force X is smaller than the generated driving force T by a constant width during the stoichiometric air/fuel mixture ratio control at the step 115, the routine goes to a step 116 immediately in which the engine control mode is switched to the lean air/fuel mixture ratio control mode since it is not necessary to provide the present output power for the engine 27. If the estimated driving force X is larger than the generated driving force T by the predetermined width at the step 117, the routine goes to a step 118 in which the control mode of the air/fuel mixture of the engine 27 is immediately switched to the normal stoichiometric air/fuel mixture control mode since the present output power of the engine 27 is insufficient. In another case, namely, in the case where the estimated driving force X falls in a range generally equal to the generated driving force T (No at the step 117 and No at the step 115), the routine goes to a step 119 since no inconvenience would occur with the air/fuel mixture ratio control mode left unchanged. It is noted that X>T at the step 117 means that X is sufficiently large than T+δ and X<T at the step 115 is sufficiently smaller than T−δ. A symbol δ denotes a threshold for the comparison between X and T and is derived empirically according to an experimental data.

Then, the routine goes to the steps 119 and 122 to change the settings of the gear range shifting characteristics of the automatic power transmission 28 according to the result of comparison of the driving forces of X and T. If the present setting of the gear range shifting characteristic at the step 119 is in the higher geared characteristic (Yes at the step 119) and X>T at a step 120 (Yes), it means that the driving power is insufficient so that the routine goes to a step 121 to change the setting of the higher geared characteristic to the normal characteristic. If the present gear shifting characteristic is not in the higher geared characteristic (No) at the step 119, the routine goes to a step 122 in which the CPU determines whether the present setting of the gear range shifting characteristic is in the normal characteristic. If Yes at the step 122, the routine goes to a step 123 in which the CPu determines whether X<T. If No at the step S123 (X>T), the routine goes to a step 127 in which the present normal characteristic is changed to the lower-geared shifting characteristic since even at the normal characteristic the output power of the driving train is insufficient. On the other hand, if No at the step 119 and No at the step 122, it means that the present setting of the gear range shifting characteristic is in the lowered gear shifting characteristic and the routine goes to a step 124. At the step 124, the CPU determines whether X<T. If the present gear range shifting characteristic is in the lower geared characteristic (No at the steps 119 and 122) and X<T (Yes at the step 124), the routine goes to a step 126 since the output power of the driving system is excessive. At the step 126, the CPU changes the present lower geared shifting characteristic to the normal characteristic. On the other hand, if the present gear range shifting characteristic is in the normal shifting characteristic at the step 122 (Yes) but if X<T at the step S123 (Yes), the routine goes to a step 128 in which the CPU changes the present normal characteristic to the higher geared shifting characteristic since it means that the output power is still excessive. It is noted that if the present gear range shifting characteristic is in the lower geared shifting characteristic at the steps 119, 122 and if X>T (No) at the step 124, the routine goes to a step 125 to determine whether X<<T (the difference between X and T is too large to exceed the predetermined width). If Yes at the step 125, the routine goes to a step 127 in which the lower geared shifting characteristic is left unchanged since the present running condition is on an emergency run on an ascending slope or in an abrupt acceleration.

Next, at a step 129, the CPU determines whether the torque converter of the automatic power transmission 28 is in the locked-up state. If the torque converter is in the locked-up state and X>T (Yes) at a step 133, the routine goes to a step 134 to release the lock-up state of the torque converter so as to function the torque amplification factor by means of the torque converter. If the torque converter is not in the locked-up state (No) at the step 129, the routine goes to a step 130 in which the CPU determines whether the vehicle speed detected by a vehicle speed sensor (S) indicates higher than a predetermined speed. If Yes at the step 130, the routine goes to a step 131 in which the CPU determines whether X<T. If Yes at the step 131, the routine goes to a step 132 in which the CPU outputs a command signal to the automatic power transmission 28 to lock up the torque converter. In other cases, the routine is ended.

In the driving force controlling apparatus in the first embodiment, the driving force at a vehicular passing point several seconds after the present position is estimated so that the settings of the driving characteristics of the engine 27 and automatic power transmission 28 are adjusted in anticipation. Thus, the vehicular driver is not aware of the delay in operation for the settings which require considerable times to operate the shifting of the control modes and shiftings of the gear range shifting characteristics. Since the driving force several seconds after the present passing point can be derived relatively from the present actual driving force and the anticipated road gradient difference, it is not necessary to measure the parameters contributing largely to the running resistance such as the number of vehicular occupants, engine's characteristic variation due to the aging effect, the atmospheric pressure, and road wheel wear-out condition. In addition, since the anticipated distance to the estimated position is varied according to the running road situations and, when the vehicle approaches to the traffic intersection, the more future anticipation of the estimated position is temporarily halted until the forward direction is ascertained, the possibility of the advance control of the driving force due to an erroneous forward direction is extremely reduced. Furthermore, since the driving forces are estimated and are averaged (for example, using the moving average) at the plurality of positions from among the anticipated distances of the estimated positions about 100 meters ahead of the present positions, the estimation accuracy of the driving force can be higher than those case derived at a single estimated position and the number of times changes in the settings of the driving characteristics of the engine and automatic power transmission are carried out can be minimized.

It is noted that the first embodiment is not limited to the lock-up torque converter equipped automatic power transmission 28 but is applicable to a continuously variable transmission (for example, CVT). Although, in the first embodiment, the driving force is estimated on the basis of height data derived from the electronic road map 12 as described above, the gradient data may be utilized in place of the height data. The gradient means the height variation per the run at a unit length of distance so that the height data are derived by accumulating the gradients with a predetermined point of place as a reference. In this sense, the height is replacable with the gradient. Although in the above-described first embodiment the height is used, the height may be changed to the gradient since the height is calculated by the gradient multiplied by the running distance.

It is also noted that the structure of FIG. 2 is commonly applicable to those of the other embodiments including second through eighth embodiments. The functions in the respective embodiments are individually achieved according to the selections of the various sensors S, utilizing methods of the memory unit 29, and the content of the driving force control program interrupting the navigation processing program by means of the arithmetic operation unit 23. Furthermore, if, in the apparatus structure of FIG. 2, the engine 27 is replaced with a steering characteristic driving block and the automatic power transmission 28 is replaced with a suspension damping force switching block, it is possible to perform a vehicular body anticipation control of a vehicular body performance, as described in a Japanese Patent Application First Publication No. Heisei 2-48210. In this case, the steering characteristic and suspension damping force characteristic can be switched in anticipation of a road surface condition at the estimated position of the vehicle.

(Second Embodiment)

Figure 8A:
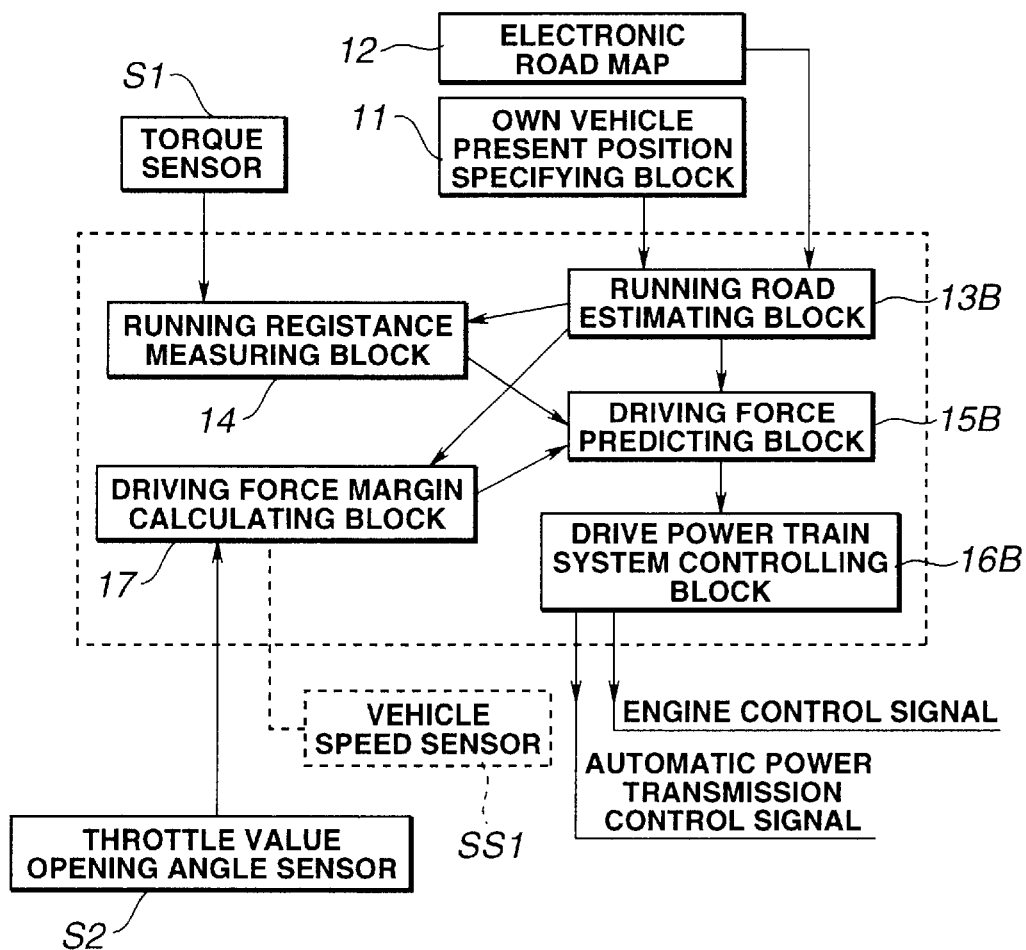
FIG. 8A is a functional block diagram of the vehicular driving apparatus in a second preferred embodiment according to the present invention.

FIGS. 8A shows a second preferred embodiment of the driving force controlling apparatus according to the present invention.

Figure 8B:
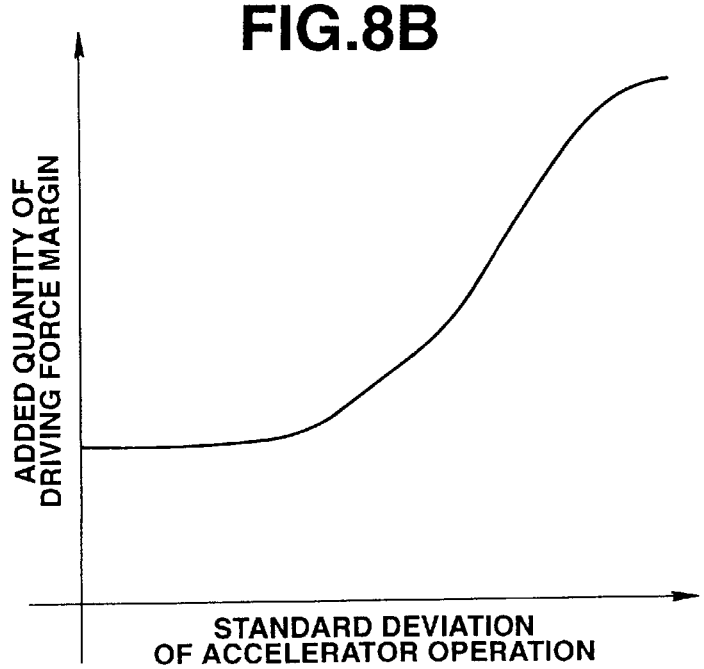
FIG. 8B is a characteristic graph representing a relationship between added quantity of a driving force margin and standard deviation for the accelerator pedal operation.

FIG. 8B shows an explanatory view of added quantity (variable) of a driving force margin.

Although in the first embodiment the required driving force f(x) for the vehicle to run at an estimated interval of distance is calculated, an operation such as an abrupt acceleration based on a free intention of the vehicular driver is not taken into consideration of deriving the value of the required driving force. Hence, if the fuel consumption is suppressed with the estimated driving force f(x) derived at maximum, the vehicle driver tends to doubt about the insufficient engine output power for coping with a sudden acceleration by the vehicle driver. To prevent such a vehicular driver doubt of the engine output power, in the second embodiment, the estimation of the driving force with driving force margin added to the required driving force for the vehicular run is carried out.

It is noted that since the same reference numerals as those recited in the first embodiment designates the corresponding elements in the second embodiment, the detailed description of the same reference numerals will be omitted here.

In FIG. 8A, the running resistance measuring block 14 measures the actual running resistance on the basis of the output signal derived from the torque sensor S1. The running road estimating block 13 derives the present position of the vehicle, estimates the position along the running route of travel 100 meter ahead of the present position, and searches various kinds of information including height data related to the present position and the estimated position from the electronic road map 12. These information (height data) and the result of the estimation of the estimated position are transmitted to the running resistance measuring block 14, a driving force margin calculating block 17, and a driving force predicting block 15B. The driving force margin calculating block 17 determines a level of the driving force margin on the basis of the output condition of the opening angle sensor S2 and the kinds of roads.

The level of the driving force margin to be added to the required driving force to run the vehicle is dependent on the condition of the running road and driving tendencies that the vehicle driver naturally has.

For example, when the vehicle runs on a freeway, there is a high possibility of the vehicle driver passing another vehicle ahead so that the vehicle driver makes a feeling that this vehicle becomes failure in acceleration during the passing the other vehicle ahead unless a considerably large driving force margin is secured. On the other hand, in a case where the vehicle follows the preceding vehicle with a constant intervehicle distance on the same traffic lane of a regional road or street, it is not required to have so large driving margin. In addition to the driving margin dependent upon the kinds of roads and vehicular environmental situation, it is necessary to consider the driving characteristic of the driver. For example, the vehicle driver whose numbers of times the passing the other vehicle ahead is carried out is less even on the freeway does not, in general, tend to try an abrupt passing of the other vehicle ahead on the other kinds of roads.

The driving force margin calculating block 17, at first, determines one of the kinds of roads on which the vehicle is presently running (for example, freeway, mountain road) during the run of the vehicle which is transferred from the running road estimating block 13B and which is searched from the electronic road map 12. For example, the kinds of roads are roughly classified into the freeway, general road, congested traffic road, and the mountain road. In addition, the driving force margin calculating block 17 stores and determines the number of traffic lanes on the same road in the run of the vehicle and differentiate the driving force margin according to the kinds of roads in run and the numbers of traffic lanes. The classification of the kinds of roads and the number of traffic lanes are stored into a recording medium (CD-ROM) of the electronic road map 12 as attribute information to the road map information. For example, in the case of the freeway, the driving force margin $\Delta f(X)$ is 50% with respect to the driving force f(x). In the case of the congested traffic road, the driving force margin is 20% with respect to the driving force f(x). The percentage values of these driving force margins are derived empirically and are mapped.

The driving force margin calculating block 17 samples an analog signal input from the acceleration opening angle sensor S2 at a predetermined timing so as to derive a standard deviation of an accelerator operation for each unit of time. The large standard deviation corresponds to the large-degree repetitive operations on the accelerator. Since a high possibility of generations in abrupt accelerations at a high frequency is present with the large numbers of times the accelerator operations carried out by the driver, the large driving force margin is previously set by which the abrupt accelerations can be handled, as shown in FIG. 8B. The small degree of the standard deviation means that there is a low possibility of the future large acceleration operations by the driver so that the driving force margin is narrowed. It is noted that the standard deviation of the accelerator operation may be replaced with a standard deviation of a vehicle speed or engine revolution speed. The driving force margin calculating block 17 transmits a maximum value of the driving force margin derived by the several methods described above.

The driving force predicting block 15B adds the driving force margin $\Delta f(x)$ derived by the driving force margin calculating block 17 to the driving force f(x) based on the actual running resistance estimated in accordance with the procedure of the first embodiment to derive the required driving force FF(x).

$$FF(x)=f(x)+\Delta f(x).$$

The required driving force FF(x) is defined as the required driving force several seconds after the time at which the vehicle has passed the present position. The driving system controlling block 16B adjusts the setting of the engine air/fuel mixture ratio controlling modes, gear range shifting characteristic of the automatic power transmission, and the locked-up state of the torque converter using thus derived required driving force FF(x). The driving system controlling block 16B changes the setting of the air/fuel mixture ratio control modes and gear range shifting characteristics of the automatic power transmission several seconds before reaching to the estimated position so that the fuel consumption is suppressed in a range which can cope with the required driving force FF(x).

In the driving force controlling apparatus in the second embodiment described above, the driving force margin is defined from the situation in roads and the driving characteristic of the vehicular driver and the anticipation control is carried out on the basis of the required driving force including the driving force margin. Hence, with the driving force control to save the fuel consumption achieved, the problem of a deterioration in the driving characteristic due to an unintended acceleration can be solved. In addition, some drivers hardly make the abrupt acceleration of the vehicle. For such drivers as described above, the set driving force margin becomes automatically be reduced. With the driving force at the position x set to a small value, the reduction of the fuel economy due to the abrupt acceleration can be prevented.

Figure 9:
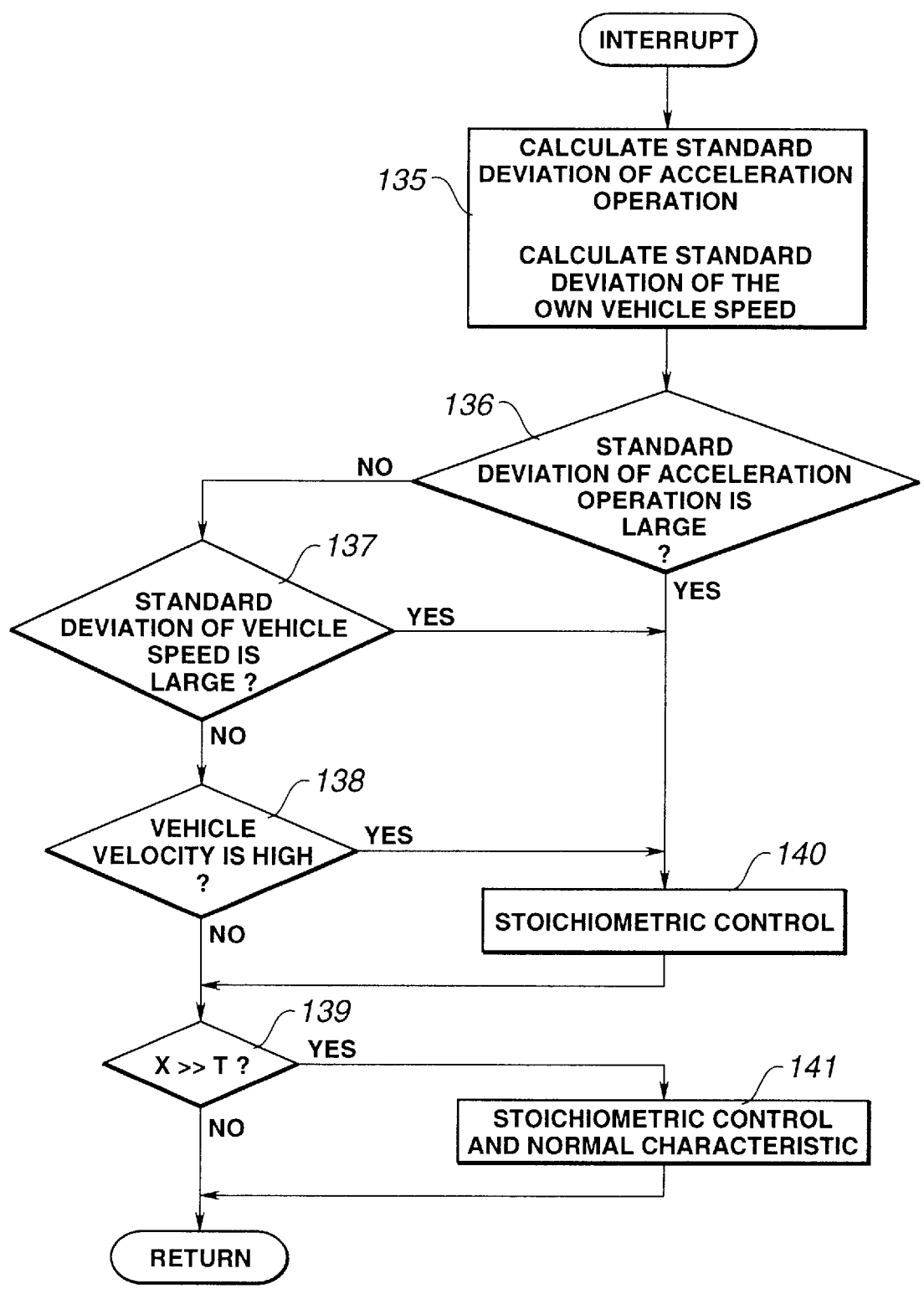
FIG. 9 is an operational flowchart of a driving force margin in a modification of the second embodiment shown in FIG. 8A.

FIG. 9 shows an operational flowchart for setting the driving force margin in a modification of the second embodiment. In the modification of the second embodiment shown in FIGS. 9, and 10, the driving force margin is derived from the driving situation of the vehicle driver (namely, the opening angle of the engine throttle valve) and the running speed of the vehicle, not rested on the searched information from the electronic road map 12.

It is noted that the whole flowchart of FIG. 9 is interrupted in series with the flowchart of FIGS. 5 and 6 of the first embodiment.

Figure 10:
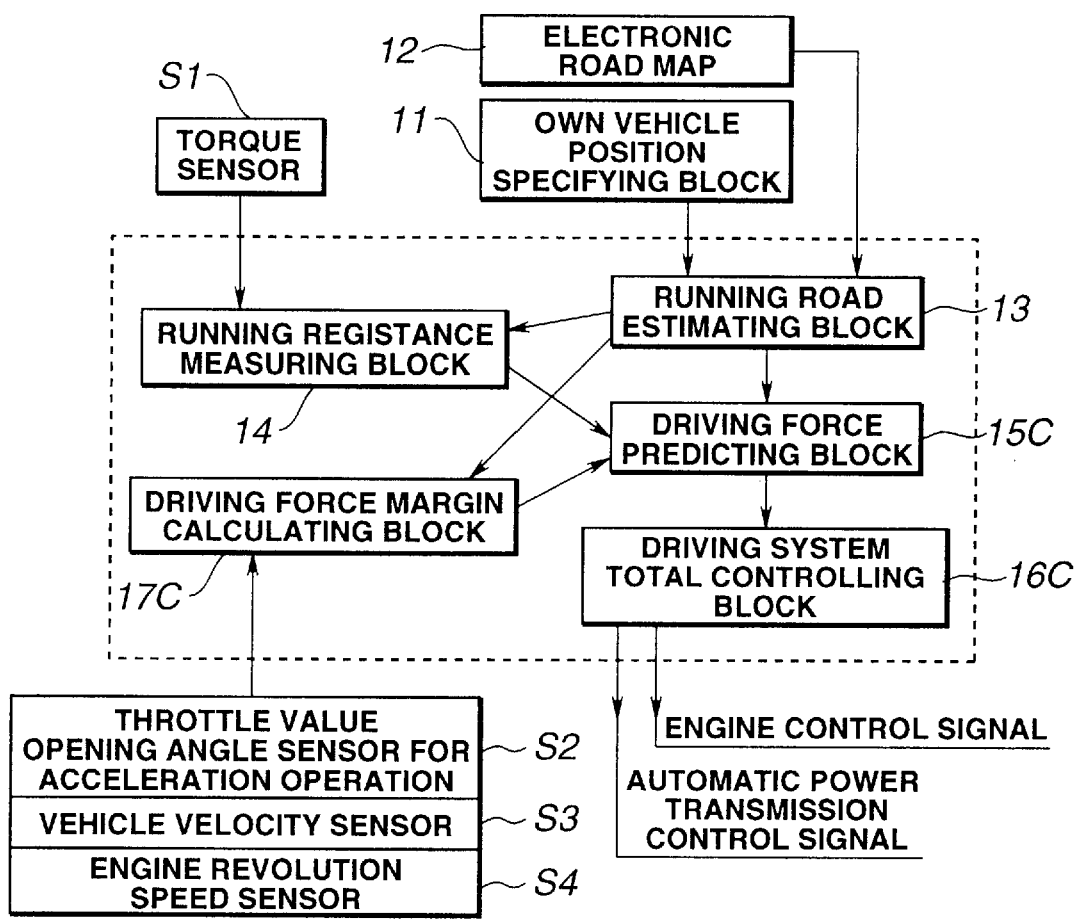
FIG. 10 is a functional block diagram of vehicular a driving force controlling apparatus in a third preferred embodiment according to the present invention.

It is also noted that a vehicle speed sensor S3 is connected to the driving force margin calculating block 17C in parallel to the accelerator opening angle sensor S2, as shown in FIG. 10. The vehicle speed sensor S3 measures an ever-changing velocity of the vehicle with respect to the ground.

As shown in FIG. 9, when this interrupt routine is started, the CPU calculates values of the standard deviations of accelerator operations and vehicular velocities at a step 135. At a step 136, the CPU determines whether the standard deviation value of the accelerator operations is relatively large (this means that the present driver has a high possibility of trying the abrupt acceleration). If it is large (Yes) at the step 136, the routine goes to a step 136.

On the other hand, if the standard deviation of the accelerator operations is small (No at the step 136), the routine goes to a step 137 in which the CPU determines whether the standard deviation value of the vehicle velocities, in turn, is relatively high. If the standard deviation of the vehicle velocities is relatively high (large) (this means that the repetitions of accelerations and decelerations are carried out). If the value of the standard deviation is high (large) (Yes) at the step 137, the routine goes to a step 140. On the other hand, in a case where the standard deviation of the vehicle velocities is small (No) at the step 137, the routine goes to a step 138 in which the CPU determines whether the vehicle velocity is relatively high.

If the vehicle velocity is high at the step 138, this means that the vehicle is running on the freeway and there is a high possibility of requiring an abrupt high power due to execution of a passing through another vehicle ahead and the routine goes to the step 140.

At the step 140, the CPU sets the driving characteristic of the engine to the stoichiometric control to reach to the stoichiometric air/fuel mixture ratio of the engine 27.

Thereafter, the routine goes to a step 139 in which the moving average value of the presently generated driving force (generated driving force T) is compared with the moving average value (estimated driving force X) of the estimated driving force at the forward interval of distance. If X>>T (the estimated moving averaged driving force X is considerably larger than the generated moving averaged driving force T) at the step 139, the routine goes to a step 141 in which the engine 37 is in the stoichiometric control mode and the gear range shifting characteristic of the automatic power transmission 28 is changed to the normal characteristic so as to take a higher priority for securing the output power.

In the modification of the second embodiment, the driving force margin is calculated from the combination between the output signals of the accelerator opening angle sensor S1 and the vehicle speed sensor S3. Thus, it is not necessary to read in the kinds of roads and the number of the traffic lanes on the same road from the electronic road map. A calculation burden on the driving force margin calculating block 17 is relieved by the reduced quantity of information handled. It is noted that the driving force margin may be estimated from only the standard deviation of the accelerator operations.

Under a supposition that the presently generated driving force would be required in the near future, with the estimated driving force f(x) at the position x replaced with the presently generated driving force f(P), the driving force margin may be set with the driving force f(P) multiplied by a constant representing a width of the acceleration upper and lower limits. Thus, the estimation of the driving force margin in the second embodiment is established without the presence of the electronic road map 12. For example, as shown in FIG. 8B, the standard deviation of the accelerator operations and its corresponding addition quantity of the driving force margin are mapped in a form of table and the addition quantity of the driving force margin is estimated immediately from the standard deviation of the accelerator operations. Suppose that a rate of the driving force margin recited in the table is φ and the required driving force derived with the driving force margin added is FF(x).

$$FF(x)=f(x)\times(1+\phi).$$

(Third Embodiment)

FIG. 10 shows a third preferred embodiment of the driving force controlling apparatus according to the present invention.

The structure of the driving force controlling apparatus shown in FIG. 10 is almost the same as that in the first embodiment. However, in the third embodiment, a driving system total controlling block 16C is added to carry out a more precise allocation of the settings for the respective situations.

The driving force margin calculating block 17C calculates the driving force margin on the basis of output states of the accelerator opening angle sensor S2, the vehicle velocity sensor S3, and the engine revolution speed sensor S4 without use of the searched information from the electronic road map 12.

The driving force predicting block 15C derives the required driving force f(x) by adding the driving force at the anticipated point of place x estimated from the present driving force in the same procedure as the first embodiment to the driving force margin derived by the driving force margin calculating block 17C. The driving system total controlling block 58 is provided with a map defined what mode of control should be carried out for the required driving force f(x) at the anticipated point of location x. The driving system total controlling block 16C in principle sets the enlarged air/fuel mixture ratio of the engine, namely, the lean burn control mode provided that the required driving force f(x) is below a predetermined value. On the other hand, if he required driving force is larger than the predetermined value, the driving system total controlling block 16C sets the engine to the stoichiometric air/fuel mixture ratio control mode. The driving system total controlling block 16C sets the high geared characteristic to the automatic power transmission if the required driving force f(x) is relatively smaller and sets the lower geared shifting characteristic thereto if the required driving force f(x) is relatively large.

It is noted that if the setting of the respective control items are mechanically carried out only by a simple magnitude relationship between the presently generated driving force which is being generated at present, the estimated required driving force, and the predetermined constant, some problems under several special situations would occur. Hence, it is necessary to allocate to a special setting for such special situations.

In addition, if the settings of a plurality of control items are simultaneously changed, a response of the vehicle to the input of the accelerator operation is abruptly changed so that the vehicle driver may confuse this abrupt change in the response. Hence, the timings of the switching operations for the respective control items are adjusted so that a continuity in the driveability is required to be secured. The driving system total controlling block 16C maps a combination of the setting contents of the plurality of control items so as to accommodate to the individually distinct situations.

In addition, the driving system total controlling block 16C adjusts the switching order and switching timings so as to minimize a discontinuity feeling of the driving sense along with the switchings in the respective control items.

This function is effective in a case where the driving margin is set according to the kinds of roads and individually different situations of the drivers as described in the second embodiment. The driving system total controlling block 16C causes the following settings to be allocated to for the remarkably increased individual situations of the combinations:

(1) When the standard deviation of the present accelerator operations is relatively large, the engine setting is carried out such that the stoichiometric air/fuel mixture ratio control mode is carried out at the point of place denoted by x. The large standard deviation of the accelerator operations means that such a situation that the driver requires the large driving force and requires, in turn, no large driving force occurs. In this situation, a high possibility of a strong depression of the accelerator pedal even at the future interval of distance to be traveled. In such a situation as described above, if the engine is placed in the lean burn control mode, the increase in the driving force due to the strong depression on the accelerator pedal during the acceleration is small and the margin on the depression angle of the accelerator pedal becomes reduced. Thus, the vehicle driver feels that this vehicle fails to accelerate or the vehicle is difficult to be accelerated.

(2) In a case where both values of the standard deviations of the present velocities of the vehicle and of the accelerator operations are smaller than the predetermined value preset empirically, the engine air/fuel mixture ratio control is placed in the lean burn control mode. The small standard deviation of the accelerator operations is deemed to be such that the vehicle driver does not carry out frequently the accelerations and decelerations and the small standard deviation of the vehicle velocities is deemed to be such that the vehicle runs at the cruise speed and the cruise speed is maintained. In this case, since the possibility of the abrupt acceleration is low in the near future of travel, the engine air/fuel mixture ratio is changed in the lean burn control so that the fuel consumption is suppressed.

(3) In a case where the standard deviation of the present vehicular velocity variations is small and the velocity is relatively high, the combination in the lean burn control mode of the engine air/fuel mixture ratio control and higher-geared shifting characteristic is adopted. The small velocity variation and high-speed run are deemed to be such that the vehicle runs on the freeway and the number of times the passing of the other vehicles ahead is carried out is extremely less. In this situation, even though the extremely reduced fuel consumption is brought out due to the combination of the settings of the lean burn control and higher-geared characteristic, other disadvantages cannot occur.

(4) On the contrary, if the standard deviation of the present vehicle velocity variations is large and the vehicle speed itself is large, the settings of the driving characteristics of the engine and automatic power transmissions are such that the combination of the stoichiometric control and higher-geared shifting characteristics. The high velocity of the vehicle and the large variation in the vehicle velocities mean that the vehicle is running on the freeway and the passings of the other vehicles ahead are repeated at the freeway. Since the engine driveability is deteriorated due to the adoption of the lean burn air/fuel mixture ratio control mode, the driveability is secured by the stoichiometric air/fuel mixture ratio control and the higher geared shifting characteristic can bring out the higher air/fuel mixture ratio.

(5) when the moving average value of the presently generated driving force (generated driving force T) is compared with the moving average (estimated driving force X) of the estimated driving force at the forward direction interval of distance, the lean burn control mode is immediately halted if X>T during the lean burn control mode so as to avoid the insufficient acceleration ability at the future ascending slope gradient.

(6) If the result of comparison between the generated driving force T and estimated driving force is X>>T, the automatic power transmission gear range shifting characteristic is transferred to the normal characteristic from the higher geared range shifting characteristic when the higher geared range shifting characteristic is being carried out and is transferred to the lower geared shifting characteristic when it is in the normal characteristic in addition to the halt of engine lean burn control mode. Thus, such a situation that the insufficient, acceleration characteristic of the driving system can be avoided when the vehicle ascends a steep gradient slope.

(7) On the other hand, if the estimated driving force X is smaller than the presently generated driving force T by the predetermined value (X<T), the vehicle driving characteristic needs to be transferred to the normal characteristic from the higher geared range shifting characteristic in the automatic power transmission if the present geared shifting characteristic is the higher geared mode and to be transferred to the lower geared range shifting characteristic if the present geared shifting characteristic is the normal characteristic mode. The condition of X<T means that the vehicle is to run on a descending slope in the near future of the route of travel. In this case, it is important for an engine braking to be easy to be effective in the driving force control. Therefore, n this case, the gear range shifting characteristic of the automatic power transmission needs to be selected in the normal characteristic or in the lower geared range shifting characteristic, both geared range shifting characteristic being effective in the engine braking in place of the higher geared range shifting characteristic which is not effective in the engine braking.

(8) If the present gear range shifting characteristic is in the higher geared range shifting characteristic and the future estimated driving force X is larger than the generated driving force (X>T), the geared range shifting characteristic is switched to the normal characteristic.

(9) If the present gear range shifting characteristic is in the normal characteristic and the future estimated driving force X is larger than the presently generated driving force T (X>T), the geared range shifting characteristic in the normal mode is switched to the lower geared shifting characteristic.

(10) If the present gear range shifting characteristic is in the lower geared shifting characteristic and the future estimated driving force X is smaller than the presently generated driving force T (X<T), the present lower geared range shifting characteristic in the automatic power transmission is switched to the normal characteristic.

(11) If the present geared range shifting characteristic is in the normal characteristic and the future estimated driving force is smaller than the presently generated driving force (X<T), the geared range shifting characteristic is switched to the higher geared range shifting characteristic.

(12) If the engine is presently in the lean burn control mode and the future estimated driving force X is larger than the future estimated driving force T (X>T), the lean burn control mode is halted and is transferred to the stoichiometric air/fuel mixture ratio control mode.

(13) If the engine is presently in the stoichiometric air/fuel mixture ratio control mode and the future estimated driving force X is smaller than the presently generated driving force T (X<T), the engine air/fuel mixture ratio control mode is transferred to the lean burn air/fuel mixture ratio control mode.

(14) If the torque converter of the automatic power transmission is presently in the lock-up engaged and the future estimated driving force X is larger than the presently generated driving force T (X>T), the lock-up state is released.

(15) If thee torque converter is presently in the lock-up released state, the present vehicle velocity is higher than the predetermined velocity value, and the future estimated driving force X is smaller than the presently generated driving force T (X<T), the lock-up is engaged.

The respective comparison values and switching values on tables of (1) through (15) are defined by the experiment.

In addition, in the tables of (1) through (15), both of the moving average value of the presently generated driving forces (generated driving force T) and the moving average value of the estimated driving forces at the forward interval of distance (estimated driving force X) are used, the same control may be carried out on the basis of the two instantaneous values of the generated driving force at the vehicular present position and the estimated driving force at the estimated single position.

In the driving force control apparatus of the third embodiment, the so-called total control is adopted. Thus, even if the items to be controlled are increased and the great numbers of possible settings in each one item are present, an appropriate and flexible setting is possible. In addition, since the timings at which the settings for the engine and automatic power transmission are mutually adjusted, the continuity in the vehicle response is secured for the operation by the vehicle driver and such a situation that an abrupt change in the acceleration response of the own vehicle to the depression angle of the accelerator pedal does not occur.

Furthermore, in a case where such a situation that the engine braking becomes effective during the vehicular run on the descending slope, this situation being a setting outside of a basic principle of a light load with the fuel economy, the effective and appropriate setting is possible.

(Fourth Embodiment)

Figure 18A:
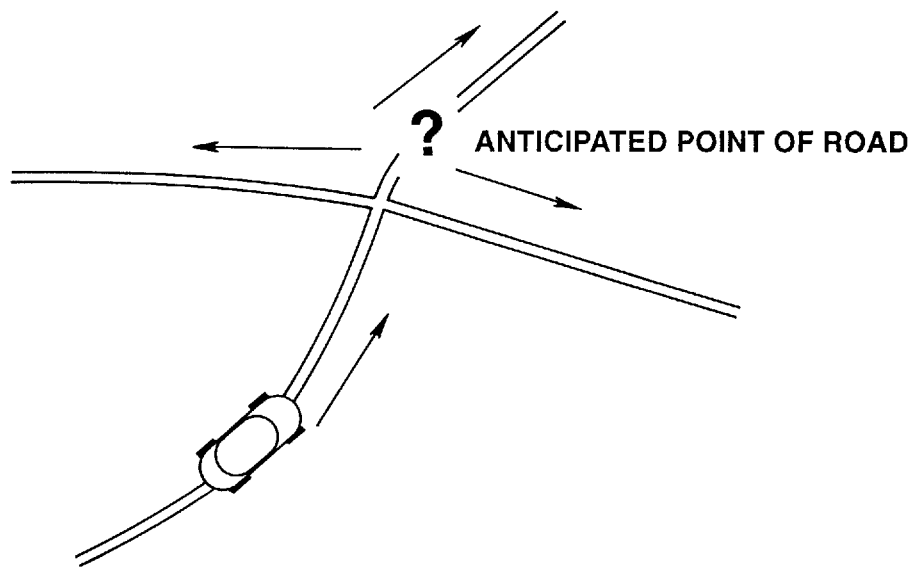
FIG. 18A is an explanatory view for a situation of the vehicle to run on an estimated position of the vehicle which is jumped over an intersection with respect to the present position of the vehicle.
Figure 18B:
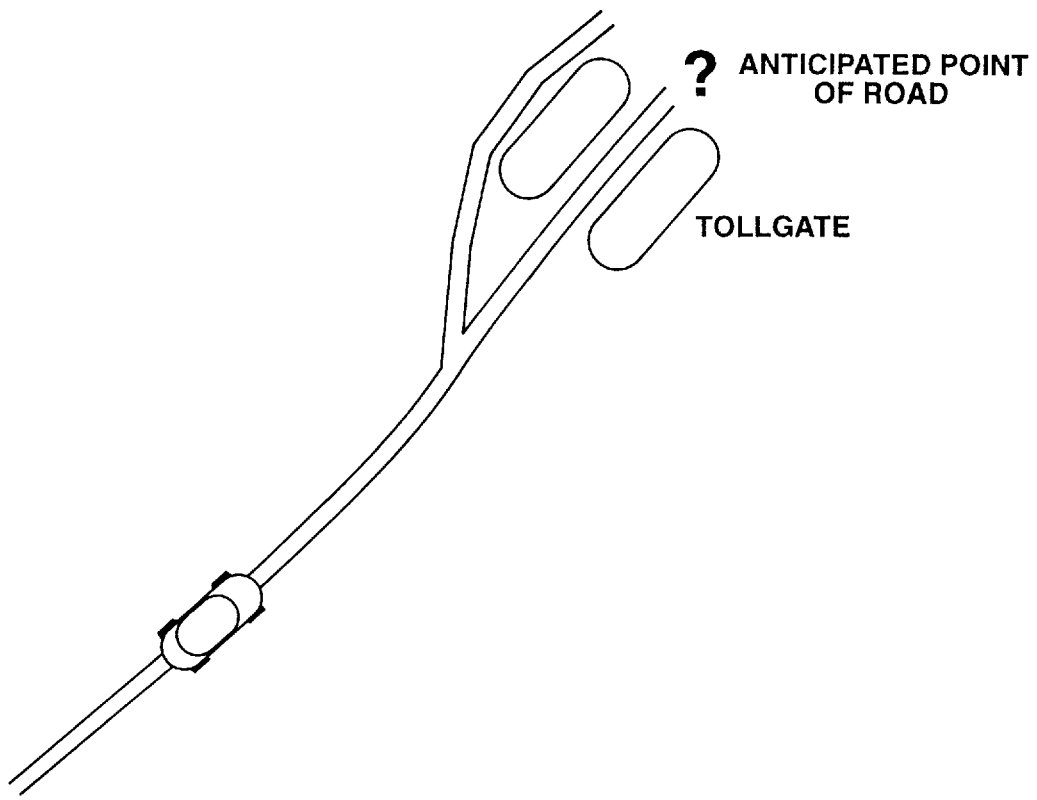
FIG. 18B is an explanatory view for a situation of the vehicle run to approach to a, for example, tollgate on a freeway.

Before explaining the vehicular driving force controlling apparatus in a fourth embodiment, FIGS. 18A and 18B show explanatory views for explaining problems to be solved in a case where the vehicular driving force controlling apparatus according to the present invention estimates the future position of the own vehicle several seconds after the time at which the vehicle is running at present position. FIG. 18A shows a traffic intersection and FIG. 18B shows a tollgate.

As in the case of FIG. 18A, when the vehicle is running on the set route of travel and is about to reach to the traffic intersection, such a problem as along which of the branched roads from the intersection the vehicular driving force controlling system should try to search the estimated position of the vehicle and estimate the driving force occurs. In the previously described first embodiment, the anticipation of the estimated driving force is upheld until the vehicle has passed the intersection as described with reference to FIG. 4. However, in this method, the anticipation control on the basis of the estimated driving force cannot be advanced any more if a plurality of intersections are present for each interval of distance of several ten meters in front of the vehicle. In the fourth and fifth embodiments of the vehicular driving force controlling apparatus, to which one of the branched roads the vehicle is to be forwarded is determined at the position before the intersection and the estimated point of road is advanced to the determined branched road.

On the other hand, in a case where the vehicle is running on the freeway and the vehicle is to be reached to a position in front of a tollgate as shown in FIG. 18B, a practical anticipation control cannot be achieved if the driving force is estimated only from the gradient information of the road located at the forward position of the vehicle. This is because the vehicle driver always stops the vehicle at the tollgate and, thereafter, restarts the vehicle. This situation is also applicable to the cases where a road junction is present, a place in front of a traffic lane change inhibiting lane is present, a traffic lane is limited due to a long term construction of road. Furthermore, in cases where the vehicle runs on a road having a remarkably varying degree of congestion according to a traffic situation, the vehicle runs on roads whose widths are remarkably and abruptly varied or roads whose frequencies of radii of curvatures are remarkably and abruptly varied geographically, and the vehicle runs on a junction directly connected from the freeway to a general road, it is not possible to make optimum settings for the engine and automatic power transmission only according to the forward road gradient information. Hence, in sixth and seventh embodiments, the settings of the driving characteristics of the engine and automatic transmission determined according to the gradient information are practically corrected utilizing the information stored by the vehicle itself and in the form of data base.

Furthermore, an erroneous estimation of the driving force is not only due to such external factors as described above but also due to a change in mind of the vehicular driver himself. For example, when the driver has made up his mind of changing the destination due to his remembrance of a thing left behind during the driving and the driver has made the vehicle U-turn, the driver has abrupt left or right turn after an abrupt braking, or makes a direction inversion through a large angle of steering change, the vehicular driving force controlling apparatus would erroneously estimate the set route of travel. As one of the other cases, as soon as the vehicle is passed by a following vehicle, there are often such drivers that the attitude of the driver is abruptly changed and the driver boldly tries to start the passing the preceding vehicle ahead, repeating abrupt accelerations and abrupt stops which are quite different from the driving pattern from now on. In such cases as described above, if the setting contents are as described above, the driver doubts the insufficient output power of the vehicle and worsened response characteristic of the vehicle. Hence, in an eighth embodiment, the settings of the engine and automatic power transmission determined according to the gradient of the road are practically corrected when the driver's mental state is changed.

Figure 11A:
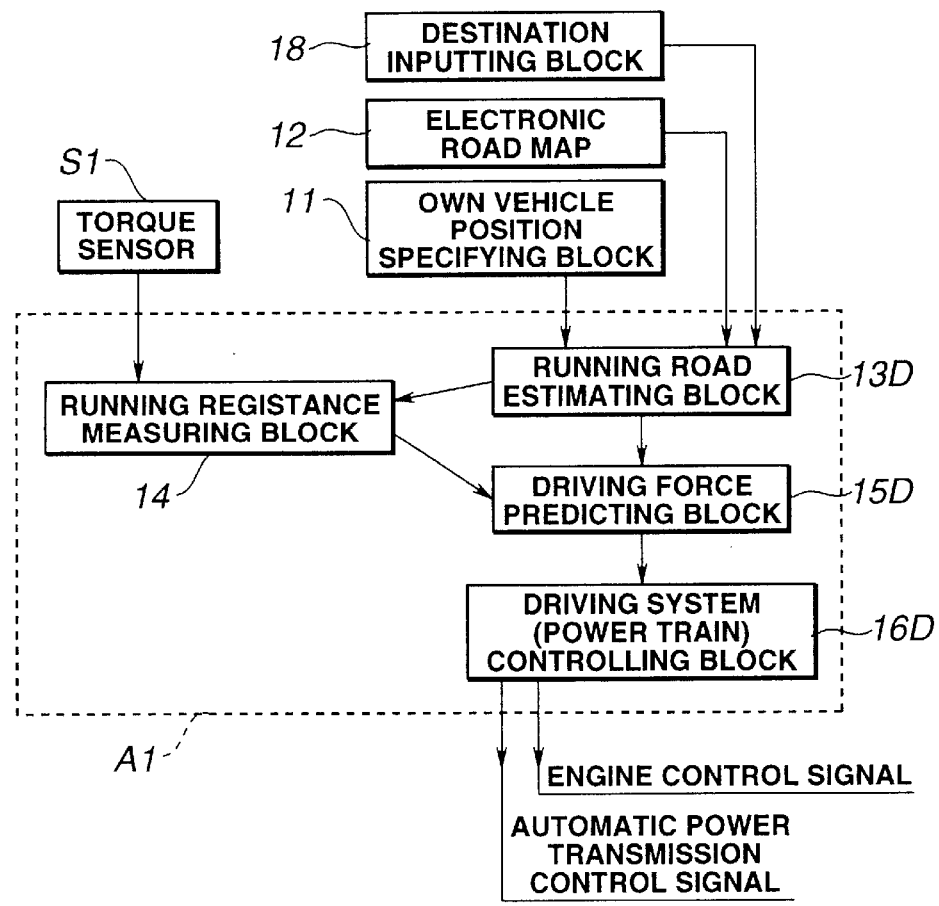
FIG. 11A is a functional block diagram of a vehicular driving force controlling apparatus in a fourth preferred embodiment according to the present invention.
Figure 11B:
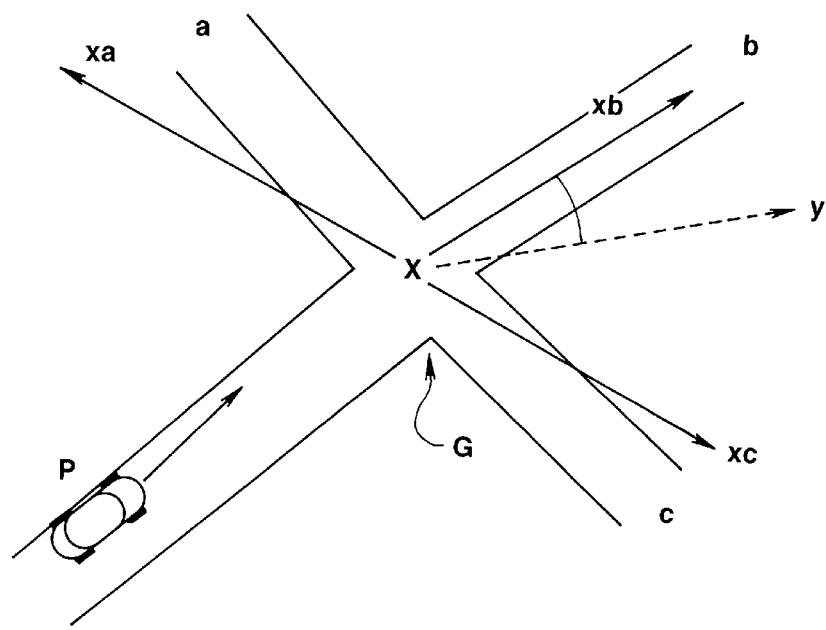
FIG. 11B is an explanatory view for explaining a technique for estimating a future position of a road to be passed which is jumped over an intersection.

FIGS. 11A and 11B show explanatory views of the vehicular driving force controlling apparatus in the fourth embodiment. FIG. 11A shows the functional block diagram of the driving force controlling apparatus in the fourth embodiment. FIG. 11B shows the explanatory view for explaining a technique of estimating the anticipated (estimated) position of the vehicle to be passed when the estimated position is jumped over the branch point (intersection). In the fourth embodiment, the driving force controlling apparatus automatically determines which one of the branched roads the vehicle is to be forwarded at any one of branch points on the basis of a designation to which the vehicle is to reach set by the vehicle driver before the start of travel of the vehicle. The same reference numerals shown in FIG. 11A designate corresponding elements used in the first embodiment.

The running resistance measuring block 14 measures an actual running resistance on the basis of an output signal of the torque sensor S1. The running road estimating block 13D derives the present position of the own vehicle in the road map stored in the electronic road map 12 according to the latitude and longitude of the own vehicle derived in the own vehicle position specifying block 11. In addition, the estimated position of the own vehicle several seconds after the time at which the vehicle is at the present position is derived by the running road estimating block 13D and the information of height between the present position and estimated position of the vehicle is transmitted from the running road estimating block 13D to the running resistance measuring block 14 and the driving force predicting block 15D. The driving force predicting block 15D corrects the actual running resistance on the basis of the height difference between the present position and the estimated position several seconds after the time at which the vehicle is at the present position and estimates the required driving force at the estimated position. The driving system (power train) controlling block 16D predictively changes the settings of the engine and automatic power transmission on the basis of the estimated required driving force so as to suppress the fuel consumption as low as possible in the range which satisfies the the exerting of the estimated required driving force, thus maintaining the purification of the exhaust gas. The running road estimating block 13D estimates the forward direction of the own vehicle at the branch point by referring to the set destination in prior to the vehicle start so that the estimated position after several seconds after the time at which the vehicle is at the present position in the estimated forward direction.

It is noted that a destination inputting block 18 through which the vehicle driver input the destination of the travel prior to the start of the vehicle. An input format of the destination at the destination inputting block 18 is, for example, such a format that a road image requested to be called on the monitor screen of the vehicular navigation system is scrolled to search for the road map image including the set destination and the destination is set through a finger touch input of the destination on the monitor screen. The destination may be inputted through a keyboard operation using the latitude, longitude, and direction of the destination.

In FIG. 11B, suppose that the own vehicle is running at the position P before the vehicle is to pass through the intersection G.

The running road estimating block 13D of the driving force controlling apparatus anticipates the gradient of the position x 60 meters through 100 meters ahead of the present position and estimates the ever-changing driving forces based on the gradient variations at the interval of distance from the present position up to the position x. It is noted that when the vehicle approaches the intersection G so that the position x has reached to a center of the intersection G, the running road estimating block 13D determines which one of the branched road directions from the intersection G the vehicle should be forwarded using the following way.

That is to say, a vector xy connecting the center position x on the intersection G with the previously set destination y is, at first, calculated. Thereafter, position coordinates of three positions a, b, and c which are one kilometer ahead of the center position x along the respective branched roads are read from the electronic road map 12 to calculate three vectors xa, xb, and xc. Then, the running road estimating block 13D calculates angles of the three vectors xa, xb, and xc with respect to the vector xy, compares with one another, and estimates that one of the vectors whose calculated angles which gives minimum is the estimated branched road forward direction. In the case of FIG. 11B, since the angle of the vector xb to the vector xy gives the minimum, the branched road in the direction of b is selected. Thereafter, in the same way as in the first embodiment, the gradient at the position x 100 meter ahead along the branched road from the position P to the b direction is anticipated so that the required driving force is estimated and the settings of the engine and automatic power transmission are adjusted.

According to the driving force controlling apparatus in the fourth embodiment, the anticipation after the passage through the intersection G before the arrival at the intersection is carried out so that the required settings of the engine and automatic power transmission are started. Hence, even in a case where the own vehicle runs at a considerably high speed, the vehicle driver is not aware of the control delay and the insufficient power due to the control delay after the vehicle has passed the intersection G. It is noted that in a route guidance type navigation system in which an optimum route of travel to the destination is recommended to the vehicle driver on the basis of the information from the normal navigation system and driving support system at a road side with the destination previously input, the anticipated road point can be set along the recommended running route. The driving support system at the road side is a system providing road information for vehicles from a great number of small transmission stations arranged long roads. However, although some drivers tend not to follow the recommended running route, this problem will be described in the foregoing seventh embodiment.

In addition, in a case where information sources installed at sides of roads can be utilized as in the case of VICS, a system may be considered such that a congestion informations, accident information, and lane limitation information are detected and a relationship between the detected information and the vehicle running route is determined so that a correction of the running route is automatically executed avoiding inconvenient roads. In this case, the anticipation of the estimated position is carried out along the corrected running route.

(Fifth Embodiment)

Figure 12A:
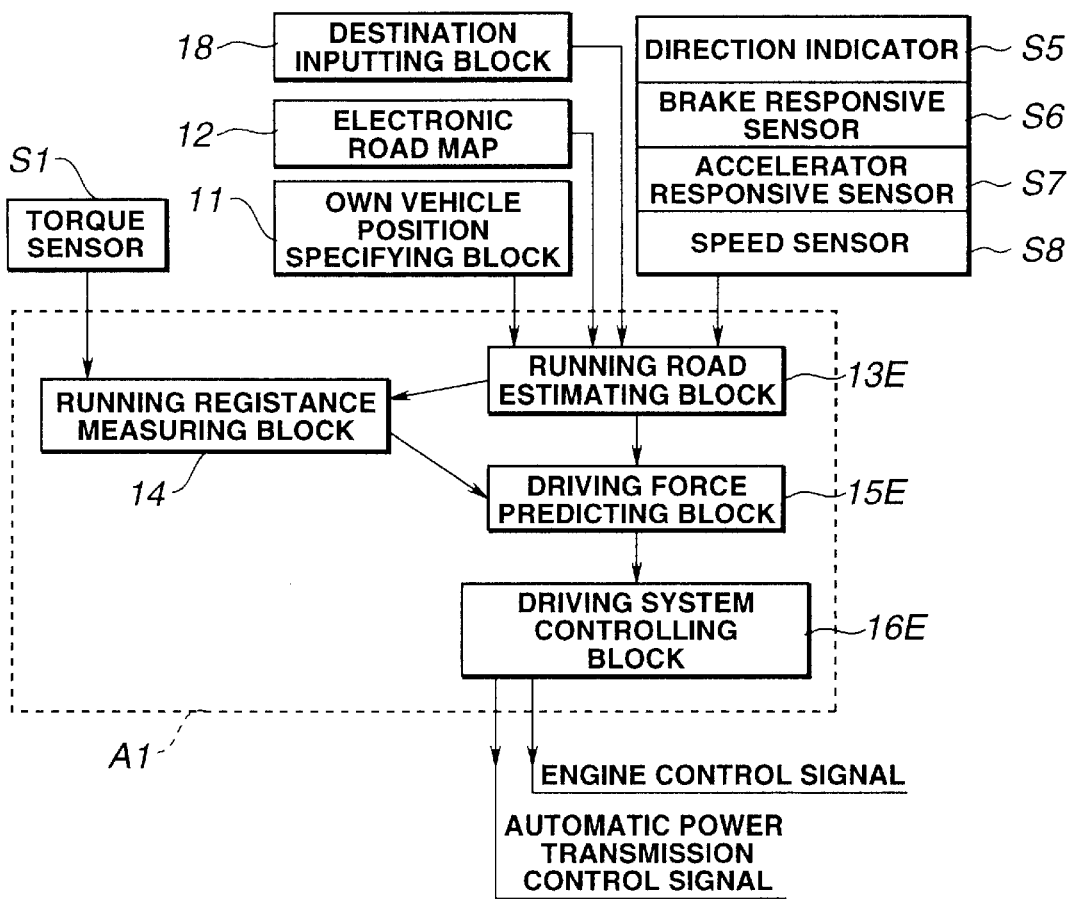
FIG. 12A is a functional block diagram of the vehicle driving force controlling apparatus in a fifth preferred embodiment according to the present invention.
Figure 12B:
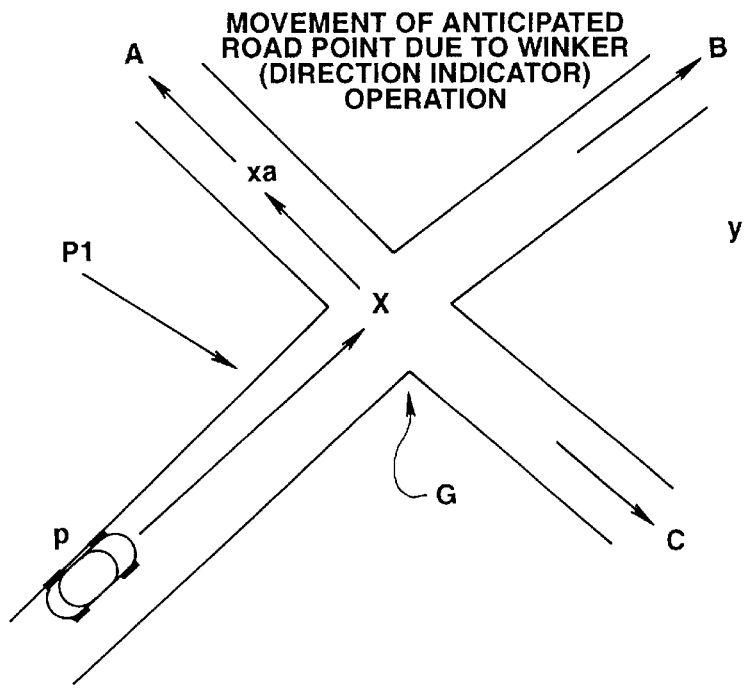
FIG. 12B is an explanatory view for explaining a position of an estimated (future) road point which is jumped over an intersection G in the case of the fifth embodiment.

FIGS. 12A and 12B show a fifth preferred embodiment of the vehicular driving force controlling apparatus according to the present invention.

FIG. 12A shows the functional block diagram of the fifth embodiment according to the present invention.

FIG. 12B shows an explanatory view for explaining an estimation of future position as the estimated position of the vehicle when the estimated position is jumped over the intersection G in the case of the fifth embodiment.

In the fifth embodiment, an intention of the driver to select one of the branched roads from the intersection G is detected through a winker (direction indicator) and the automatic determination of which one of the branched roads the vehicle is to be forwarded at the branch point is carried out. The same reference numerals as shown FIGS. 12A and 12B designate corresponding elements of the first and fourth embodiment described above.

In the fifth embodiment shown in FIG. 12A, the running road estimating block 13E derives the present position of the own vehicle at the road map stored in the electronic road map 12 on the basis of the output information of the own vehicle position specifying block 11 and derives the estimated position of the vehicle located several tens through 100 meters ahead of the present position on the basis of the derived present position of the vehicle. The running road estimating block 13E estimates refers to output states of a direction indicator (winker) sensor S5, a brake sensor S6, accelerator sensor S7, and vehicle speed sensor S8 so as to estimate the forward direction of the vehicle at the branch point (a forward direction toward which the vehicle is desired to forward by the vehicle driver) and moves the estimated position several seconds after the time at which the vehicle is at the present position to the derived forward direction. The direction indicator S5 outputs a signal corresponding to a distinction between a left turn or right turn operated by the driver on the winker. The brake sensor S6 detects a presence or absence of a depression operation on a vehicular brake pedal. The accelerator sensor S7 detects an increase or decrease in a depression quantity of the accelerator pedal. The speed sensor S8 detects a wheel (road wheel) revolution speed and outputs a digital pulse train signal per second whose pulse number corresponds to a velocity of the vehicle with respect to the ground.

In FIG. 12B, suppose that the vehicle is running on a point P1 placed in front of the intersection G. The running road estimating block 13E estimates the ever-changing driving forces based on the variations in the gradients for the interval of distance up to the anticipated road point x in anticipation of the gradient of the position x 60 meters through 100 meters ahead of the present position at which the estimation of the road point is carried out. If the vehicle, as shown in FIG. 12B, approaches the vehicle at the intersection G having three directed branched roads A, B, and C and the anticipated road point x is reached to the center position of the intersection G, the running road estimating block 13E fixes the road point x to the center position of the intersection unless the forward direction at the intersection G is ensured at this time. Then, if the vehicle driver operates the winker S5 or if a straight run is assured and determined according to the output state of the speed sensor S8, the normal anticipation of the future road point x is resumed with the estimated point of road x advanced to the determined forward direction branched road. The running road estimating block 13E continuously reads the height of the anticipated road point x a predetermined distance ahead of the center position of the intersection G from the electronic road map 12. Furthermore, during the run of the vehicle to approach to the intersection G, the running road estimating block 13E continues to read the heights of the estimated positions x. Thereafter, if the vehicle driver operates the winker to indicate either turn of left or right, the estimated points of roads x are moved to one of the roads in the turned direction.

In the case of FIG. 12B, since the winker S5 starts to indicate the vehicle's left turn at the time at which the own vehicle has run on the position of P in front of the intersection G, the branched road A is selected as the future forward direction and the point of road for the anticipation of the height is moved to a position xa which is a predetermined distance ahead of the position x supposing the left-sided road from the position x. The driving force predicting block 15E calculates the gradient from the height information read out from the electronic road map 12 so as to estimate the required driving force.

The running road estimating block 13E monitors the running speed of the own vehicle and the depression quantity (angle) of the accelerator pedal in parallel to the direction indicator S5. Thus, if a depression release of the accelerator pedal and/or deceleration of the vehicle is not present during the vehicle run approaching the intersection G, one of the branched roads having a highest degree of coincidence between each of vectors drawn from the center position of the intersection G to the respectively branched roads A, B, and C and a vector indicating the velocity of the vehicle is selected and the estimated position x is advanced to the selected branched road. Similarly, the running road estimating block 13E monitors the running velocity of the own vehicle and whether the brake pedal is depressed. Hence, if the vehicle is decelerated and/or its brake pedal is depressed, the estimated road point x is moved to a selected one of the branched road whose degree of coincidence between the corresponding one of the vectors drawn from the point of x at the intersection G to the respective branched roads A, B, and C to the vector indicating the direction of the velocity is lowest. Furthermore, if the running road estimating block 13E determines that a width of a road segment at the road to be branched from the intersection G is extremely different from the road on which the vehicle has run from the information such as the kinds of roads searched from the electronic road map 12, for example, the width of the roads is changed from a one-traffic lane road to three-traffic lane road, the running road estimating block 13E selects the branched road whose width is wider when the outputs of the speed sensor S8 and the accelerator depression responsive sensor S7 if no presence in the velocity variation and an acceleration is observed at the time during which the vehicle is to be reached to the intersection G and sets the anticipated point of road x.

In the driving force estimating block in the fifth embodiment, -the determination of one of the branched roads for the vehicle to be forwarded can be assured rather than the technique in the fourth embodiment.

Hence, if there is a low possibility of executing the erroneous driving force control with the erroneous selection of the branched roads. In addition, the vehicle driver does not feel the insufficient output power of the vehicular driving system in a case where a steep ascending slope is present on the selected branched road immediately after the passage through the intersection G. The direction indicator S5, the brake sensor S6, the accelerator pedal depression sensor S7, and the speed sensor S8 constitute such means for detecting the operation content of the vehicle driver through the input operating variables of the vehicle and identifying the forward direction of the own vehicle at the branch point of road. It is noted that each output of the brake responsive sensor S6, the accelerator depression responsive sensor S7, and the speed sensor S8 is secondarily referred to for to the output of the direction indicator S5. The processing of the fifth embodiment is possible if either or all of the brake responsive sensor S6, accelerator pedal responsive sensor S6, the speed sensor S8 are not always referred to. This is because if the direction indicator S5 is operated, its indicating direction can be used to determine the forward direction at the intersection G. In addition, the straight run at the intersection can be determined in the vase where the velocity is not so largely reduced with no operation of the direction indicator S5 and/or no operation on the brake pedal even if the vehicle approaches and enters the intersection G or in a case where some degree of acceleration of the vehicle is carried out at the intersection G.

(Sixth Embodiment)

Figure 13A:
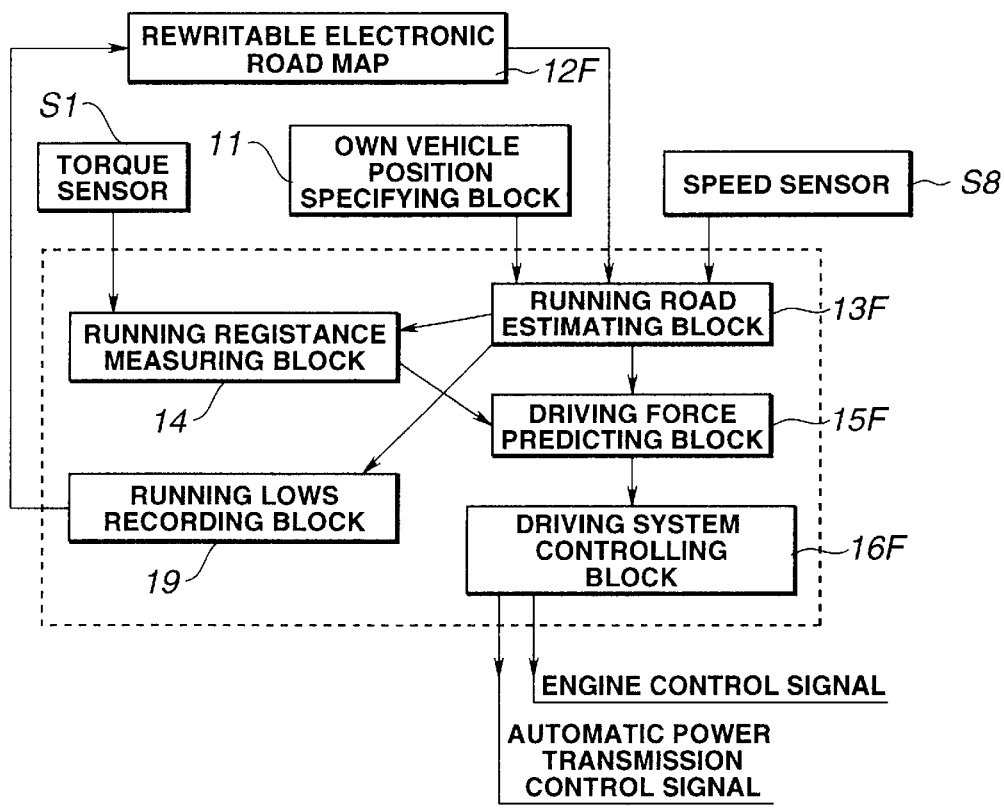
FIG. 13A is a functional block diagram for explaining a vehicular driving apparatus in a sixth preferred embodiment according to the present invention.
Figure 13B:
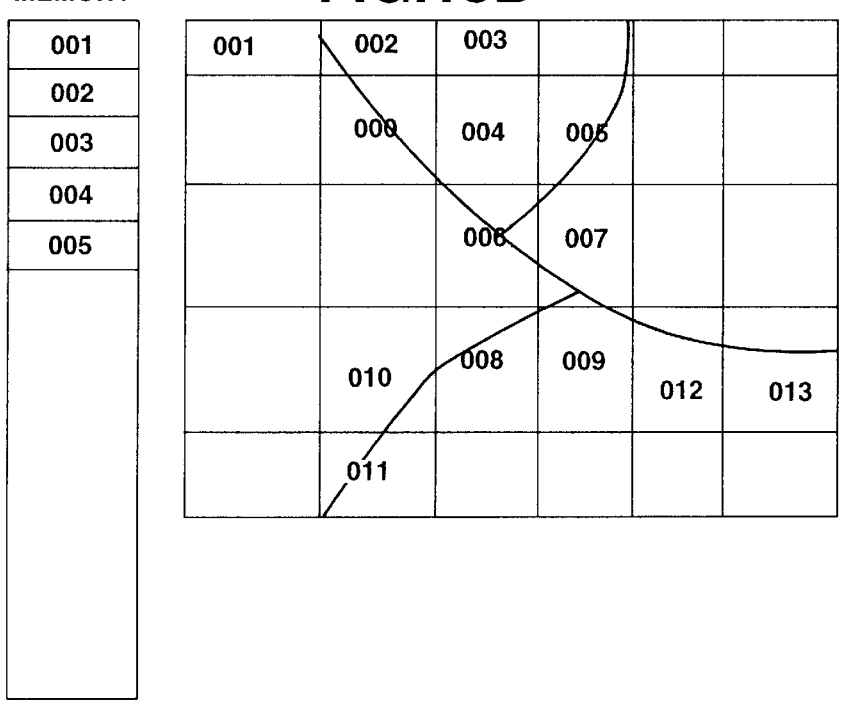
FIG. 13B is an explanatory view for explaining a memory area in a rewritable electronic road map in the sixth preferred embodiment.

FIGS. 13A and 13B show a sixth preferred embodiment of the vehicular driving force controlling apparatus.

FIG. 13A shows the functional block diagram of the vehicular driving force controlling apparatus in the sixth embodiment.

FIG. 13B shows an explanatory view for explaining a recorded state in a rewritable electronic road map.

In the sixth embodiment, a past running state is recorded on the rewritable electronic road map 12F and the estimated driving force based on the height information on the estimated position is corrected using such a unique data base as described above.

The same reference numerals shown in FIGS. 13A and 13B as those in the first embodiment designate corresponding elements in the first embodiment.

The running road estimating block 13F derives the present position of the own vehicle on the road map stored in the rewritable electronic road map 12F using the output information of the own vehicle specifying block 11 and derives the estimated position of the own vehicle several seconds after the time at which the vehicle is at the present position and located several tens meters through 100 meter in front of the present position along the road on which the vehicle runs. The running road estimating block 13F measures the ever-changing running velocity of the vehicle through the speed sensor S8 and outputs the ever-changing running velocity to a running locus recording block 19 together with the present position of the vehicle. Furthermore, the running road estimating block 13F batches the information searched from the rewritable electronic road map 12F and its own prepared information as a single file, the single file being held therein.

The running locus recording block 19 prepares the data representing the running state on the basis of the running velocity transmitted from the running road estimating block 13F and updates and records the prepared data on the ever-rewriting enabled electronic road map 12F. The data representing the running state is calculated from the previously recorded data and the present running velocity and is recorded in a state shown in FIG. 13B in which the search is possible using an address indicating the position on the road map.

It is noted that if the data representing the running state is the gear ratio of the automatic power transmission, the running locus recording block 19 sequentially stores the gear ratio with which the vehicle has run on the same roads in the rewritable electronic road map 12F. The data format is the same as in the case of the running velocity.

The running road estimating block 13F refers to the data called from the rewritable electronic road map 12F and identifies whether the running state at the estimated position is predictable. If it is predictable, this data is transmitted through the driving force predicting block 15F to the driving system controlling block 16F. The driving force predicting block 15F estimates the required driving force at the estimated position in the same procedure as in the case of the first embodiment only when the running state is determined to be predictable. The driving system controlling block 16F corrects the settings of the engine and automatic power transmission with reference to the past data in a case where the running state at the estimated position is predictable.

The data representing the running state and stored in the rewritable electronic road map 12F has a better quality whenever the running on the same location is repeated reflecting more appropriately—a situation that the location naturally has—not appearing on the road map. The following control, specifically, is executed using the past running state.

The rewritable electronic road map 12F finds out the position specified on the road map from the output information of the own vehicle position specifying block 11 and stores the instantaneous velocity into a memory area corresponding to a mesh at that location as shown in FIG. 13B.

Anyway, in a case where the vehicle is to run on a road on which the vehicular driver has no experience of travel, the rewritable electronic road map 12F does not function effectively since the data is not previously stored at all. However, even if the vehicle driver has no experience of running on such a unknown road as described above, the vehicle data=0 is previously written into the memory area corresponding to the unknown road during a shipment of the vehicle for such locations as unavoidable temporary halt and stops of the vehicle at the locations, for example, the tollgates, grade crossings, temporary halt portions, traffic intersections having no signals through which narrow roads are junctioned into wide, traffic priority roads. Whenever the vehicle runs on these locations as described above, average values between the vehicle speed data previously written including the data written during the shipment of the vehicle and the present vehicle velocity values are derived so as to update the recorded contents in the memory area of the rewritable electronic road map 12F.

Figure 14:
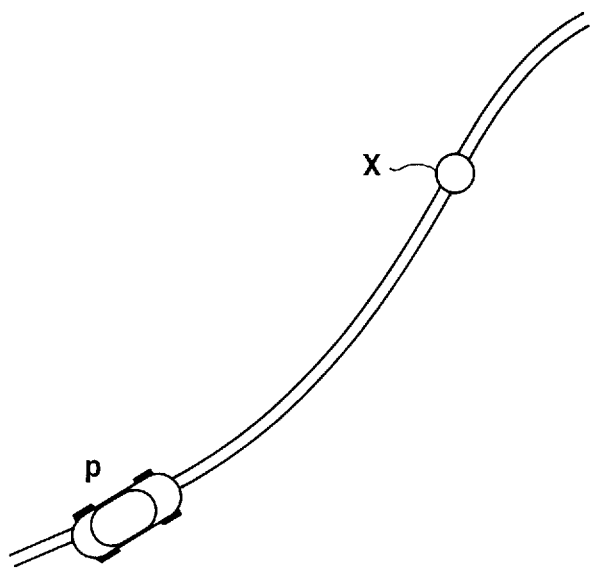
FIG. 14 is an explanatory view for explaining an example of a running state of the own vehicle in which the vehicular driving force controlling apparatus is mounted.

In FIG. 14, when the vehicle runs at the position P on the road, the running road estimating block 13F anticipates the height at the position x which is away from the position P by a predetermined distance in the vehicular forward direction from the rewritable electronic road map 12F. The driving force predicting block 15F carries out the ever-changing estimation of the driving force based on the gradient variation at an interval of distance up to the position x. At this time, the running road estimating block 13F calculates a difference between the velocity at the present position P and the velocity at the point P on which the vehicle has experienced the run at the past time.

If the difference described above is extremely large, for example, the difference is twice or more than the past running velocity, the running road estimating block 13F determines that the present running state is remarkably different from the state past experienced and halts the control of the updating the data using the past data. In addition, with the past data held in the unchanged state, the running road estimating block 13F averages the data so that the updating operation for the past data is halted.

However, in a case where at each present position of the vehicle the past velocities are all different from the present velocities, the running road estimating block 13F determines that the velocity would be varied at the points of locations x ahead of the present position at generally same procedures. That is to say, at the preceding point of location x in which the running state is at a state wherein the past velocity is approximately zero, that location has a high possibility of usual presence of traffic congestion. In this case, even if the driving force controlling block 16F determines that the height of the point of location x is higher than the present location P of the vehicle and the ascending slope is continued and sets the automatic power transmission at the lower geared range shifting characteristic to prepare the large driving force, the large driving force cannot fully be utilized provided that the high degree of traffic congestion at the point of location x is assured. It is preferable in terms of the vehicular driveability and fuel economy to drop the driving force.

Therefore, in the case where the degree of coincidence between the present velocity of the vehicle and the past velocity is high, the driving system controlling block 16F controls the engine and automatic transmission driving characteristics on the basis of the past velocity of the vehicle at the point of road x read from the rewritable electronic road map 12F in place of the required driving force at the point of location (road) x estimated by the anticipation of the height at the point of location x. Then, in a case where the past velocity at the point of location x is low, the driving system controlling block 16F selects the driving force when the vehicle cruises in place of the driving force estimated from its gradient.

For example, when it is determined that the past velocity at the point of location x at the forward ascending slope is low, the engine lean burn control mode remains unchanged for the run in the traffic congestion and for the cruise speed run and the gear range shift switching characteristic of the automatic power transmission is at the higher geared range shifting characteristic in place of the halt of the lean burn air/fuel mixture ratio control mode so as to accommodate the ascending slope and setting of the switching characteristic of the lower geared range shifting characteristic.

It is noted that the information related to the driving force generated by the vehicle, in addition to the vehicle velocity and gear ratio of the automatic power transmission, may include the engine revolution speed x gear position (gear ratio), output axle torque, the variation in velocity per unit of time, a quantity of a fuel injection into the engine commanded from an engine control unit, or its related variable (a time duration during which fuel injector(s) injects the fuel quantity). These variables may be stored in the rewritable electronic road map in place of the running velocity described above so that these variables may serve as parameters to monitor the running state of the vehicle.

In the driving force controlling apparatus of the sixth embodiment, road situations of a location at which the traffic stream is often varied although it is not usual due to the reduction of the number of traffic lanes or due to a bottle neck of the traffic stream and of a location at which the stream of the driving is always varied such as at the tollgate or intersection are stored, the information of the anticipated point of the height on the basis of these road situations is interpreted as the variation, and the controlled characteristics of the driving system are changed so that the reduction in the vehicular driveability due to the anticipation control can be relieved. The rewritable electronic road map 12F can be constituted by the combination of the CD-ROM playback unit 22 and memory unit 29 (as shown in FIG. 2).

It is noted that the driving force predicting block 15F may further correct the required driving force at the estimated position of the vehicle (or at the interval of distance up to the estimated position) in which the actual running resistance is corrected according to the height difference between the present position and estimated position on the basis of the predicted result. The driving system controlling block 16F controls the engine and automatic power transmission on the basis of the corrected required driving force. In addition, the data to be stored in the rewritable electronic road map 12F may be the data to estimate the running situation of the vehicle and running pattern. The data is not limited to the running velocity of the vehicle but may be the information related to the driving force which is being generated by the vehicle.

For example, the engine revolution speed and gear shift ratio of the transmission, opening angle of the throttle valve, and running resistance value may be stored in the corresponding memory areas.

If the data stored in the rewritable electronic road map 12F is not related to the vehicle velocity, the engine revolution speed and gear shift ratio may be converted into the velocity of the vehicle, alternatively, the opening angle of the engine throttle valve and gear shift ratio may be converted into the velocity of the vehicle, or alternatively the throttle valve opening angle and gear shift ratio may be converted into the velocity of the vehicle using the corresponding map.

(Seventh Embodiment)

Figure 15A:
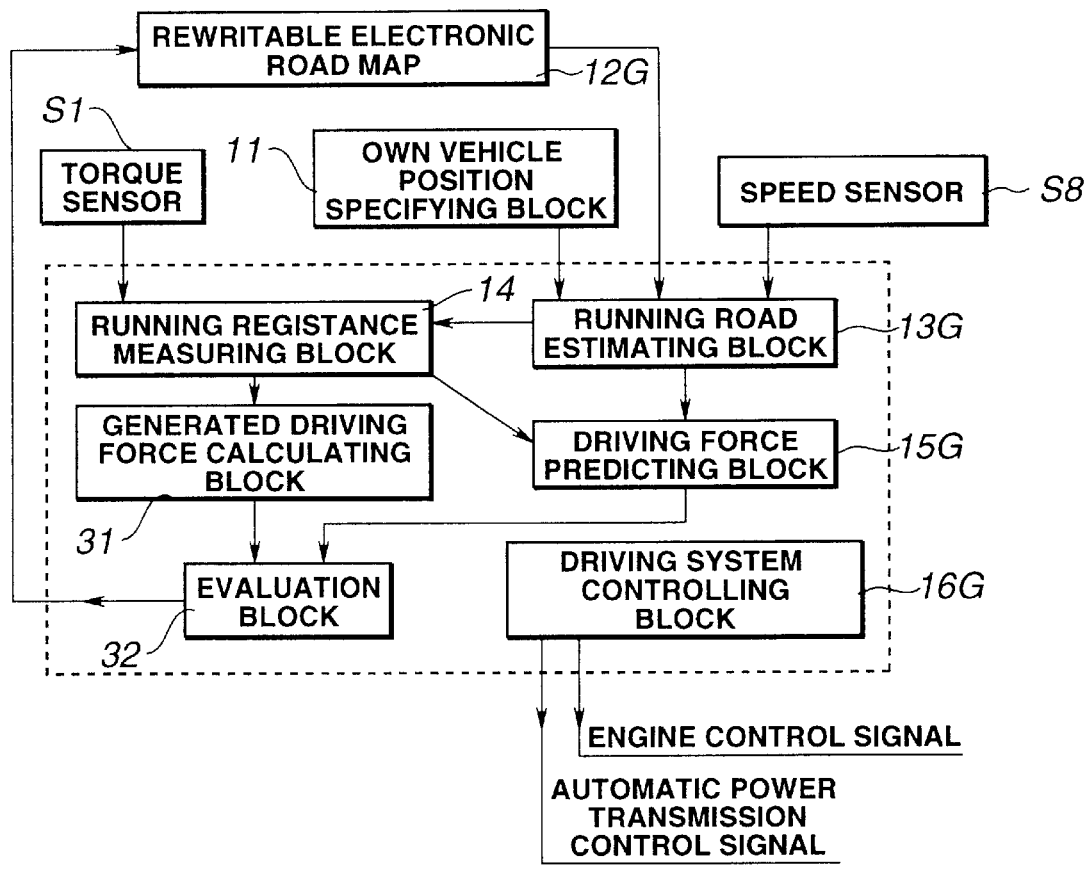
FIGS. 15A is a functional block diagram for explaining the vehicular driving force controlling apparatus in a seventh preferred embodiment according to the present invention.
Figure 15B:
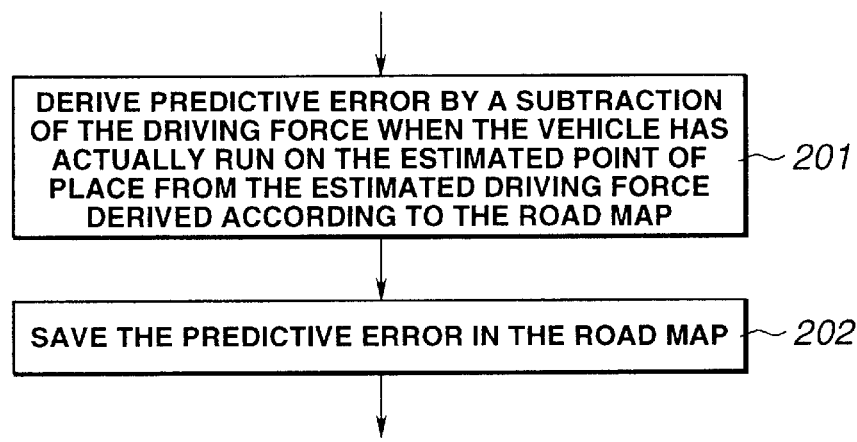
FIG. 15B is an example of a processing flowchart to be executed in an evaluation block 32 in the seventh preferred embodiment.

FIG. 15A and 15B show a seventh preferred embodiment of the vehicular driving force controlling apparatus according to the present invention.

FIG. 15A shows the functional block diagram of the seventh embodiment and FIG. 15B shows a processing flowchart of-an evaluation block 32 shown in FIG. 15A.

In the seventh embodiment, with the past driving force state recorded using the rewritable electronic road map 12G, the control contents for the engine and automatic power transmission on the basis of the anticipation in the height information are corrected using the data base of the recorded past driving force state. since the same reference numerals in FIGS. 15A and 15b as shown in the case of the first embodiment designate corresponding elements in the case of the first embodiment, the detailed explanations thereof are omitted here.

The running road estimating block 13G derives the present position of the own vehicle on the road map searched from the rewritable electronic road map 12G on the basis of the data on the absolute position derived from the own vehicle position specifying block 11.

Then, the running road estimating block 13G derives the estimated position of the own vehicle located at a position several tens meters through 100 meters ahead of the present position along the road on which the vehicle is running and located several seconds after the time at which the vehicle is at the present position.

The running road estimating block 13G holds therein various data searched from the rewritable electronic road map 12G according to the present position and estimated position. The various data include data representing an accuracy of the past estimation of the driving force at the estimated position. The driving force predicting block 15G estimates the required driving force at the estimated position on the basis of the height data between the present position and estimated position read from the running road estimating block 13G and transmits the result of estimation of the required driving force integrated with the data representing the accuracy of the past driving force estimation to the driving system controlling block 16G. The driving system controlling block 16G determines the settings of the engine and associated automatic power transmission on the basis of the estimated result of the required driving force and corrects the contents of the settings on the basis of the data representing the past estimation accuracy of the driving force.

The generated driving force calculating block 31 calculates the ever-changing generated driving force on the basis of the running resistance derived at the running resistance measuring block 14. The evaluation block 32 holds the driving force estimated by the driving force predicting block 15G up to a time at which the vehicle has reached to the estimated position, prepares the data representing the past driving force estimation accuracy from the estimated driving force and the generated driving force at the estimated position, and records the data in the rewritable electronic road map 12G as the data at the estimated position. The rewritable electronic road map 12G is previously mapped in the same way as shown in FIG. 13B and is such that the various data recorded therein is searchable for each position on the roads. The data representing the past estimation accuracy of the driving force stored in the electronic road map 12G is increased and fulfilled whenever the vehicle runs on the roads so that the situation that the location naturally has not appearing on the well known road map is appropriately reflected.

Specifically, the driving force control executed in the seventh embodiment will be described below.

Suppose that, referring back to FIG. 14, the own vehicle is running on the position P on the road. At this time, the height at the position x the predetermined distance remote from the position P in the vehicular forward direction is read in anticipation from the rewritable electronic road map 12G and the driving force predicting block 15G estimates the ever-changing the driving forces on the basis of the gradient variation at the interval of distance to the position x. Then, the driving system controlling block 16G sets in anticipation the switching characteristic of the gear range shifting characteristic and lean or stoichiometric air/fuel mixture ratio of the engine on the basis of the result of estimation.

In parallel to these estimation operations, the evaluation block 32, as shown in FIG. 15B, compares the driving force at the point of road x estimated by the driving force predicting block 15G at the preceding point of road before the point of road x and that actually confirmed at the point of road x by the generated driving force calculating block 31 so as to derive a deviation therebetween (predictive error), at a step 201.

The evaluation block 32, at the next step 202, records this deviation (predictive error) on the rewritable electronic road map 12G as the data on the own vehicle position (P=x) variable from time to time.

In the case where the own vehicle runs on the same road many numbers of times, this deviation is averaged so as to be recorded with the past data updated.

In addition, the evaluation block 32 stores an average of the deviation between the actual value and the predicted value as described above and the standard deviation onto the rewritable electronic road map 12G.

Next, suppose that in a case where the vehicle runs on the same road as shown in FIG. 14 at the next time, the vehicle is now at the position P. The running road estimating block 13G searches the point of road x from the rewritable electronic road map 12G to anticipate the point of road x and reads the height information therefrom. At the same time, the running road estimating block 13G reads the average value between the actual value and predicted value of the driving forces and its standard deviation when the vehicle has run at the previous time of run. If this average value and the standard deviation are relatively large, the driving situations are often varied so that it is estimated that it is the driving state which is difficult for the driving force to be predicted. In this case, even if the road in the forward direction is flat, the driving system controlling block 16G does not adopt the lean burn air/fuel mixture ratio control mode and the higher geared shifting characteristic but selects the normal settings, namely, the stoichiometric air/fuel mixture ratio control mode and the normal characteristic of the gear range shifting characteristic of the automatic power transmission.

In the driving force controlling apparatus of the seventh embodiment, the possibility of repeating the same setting errors is reduced in the locations where the vehicle driver has felt the insufficient power due to an erroneous prediction of the driving force at the past time and where an uneconomical running has been executed with the setting of excessive driving margin at the past time.

In addition, in a location where the prediction is difficult, a deterioration of the vehicular driveability due to the difference between the actual value and the predicted value would not be brought out.

In addition, since the difference between the predicted value and the actual value of the driving force is stored in the memory area corresponding to the map, the recording medium only may be carried into a personal computer (PC) installed in a office or plant to analyze a tendency of the prediction accuracy or to observe the result of predictions so that the carried record medium can serve as a reference document to correct coefficients used for the required driving force.

It is noted that in place of the anticipation control by means of the driving system controlling block 16G, the driving force margin may be calculated on the basis of the data on the past driving force predictions and the driving system controlling block 16G may control the adjustments of the settings in the engine and automatic transmission on the basis of the required driving force added with the driving force margin in place of the anticipation control by means of the driving force controlling block 16G. Furthermore, in place of the derivation of the actually generated driving force from the driving system output axle using the torque sensor S1, a variable corresponding to the generated driving force from the outputs of the other sensors that the torque sensor S1 may be calculated.

(Eighth Embodiment)

Figure 16:
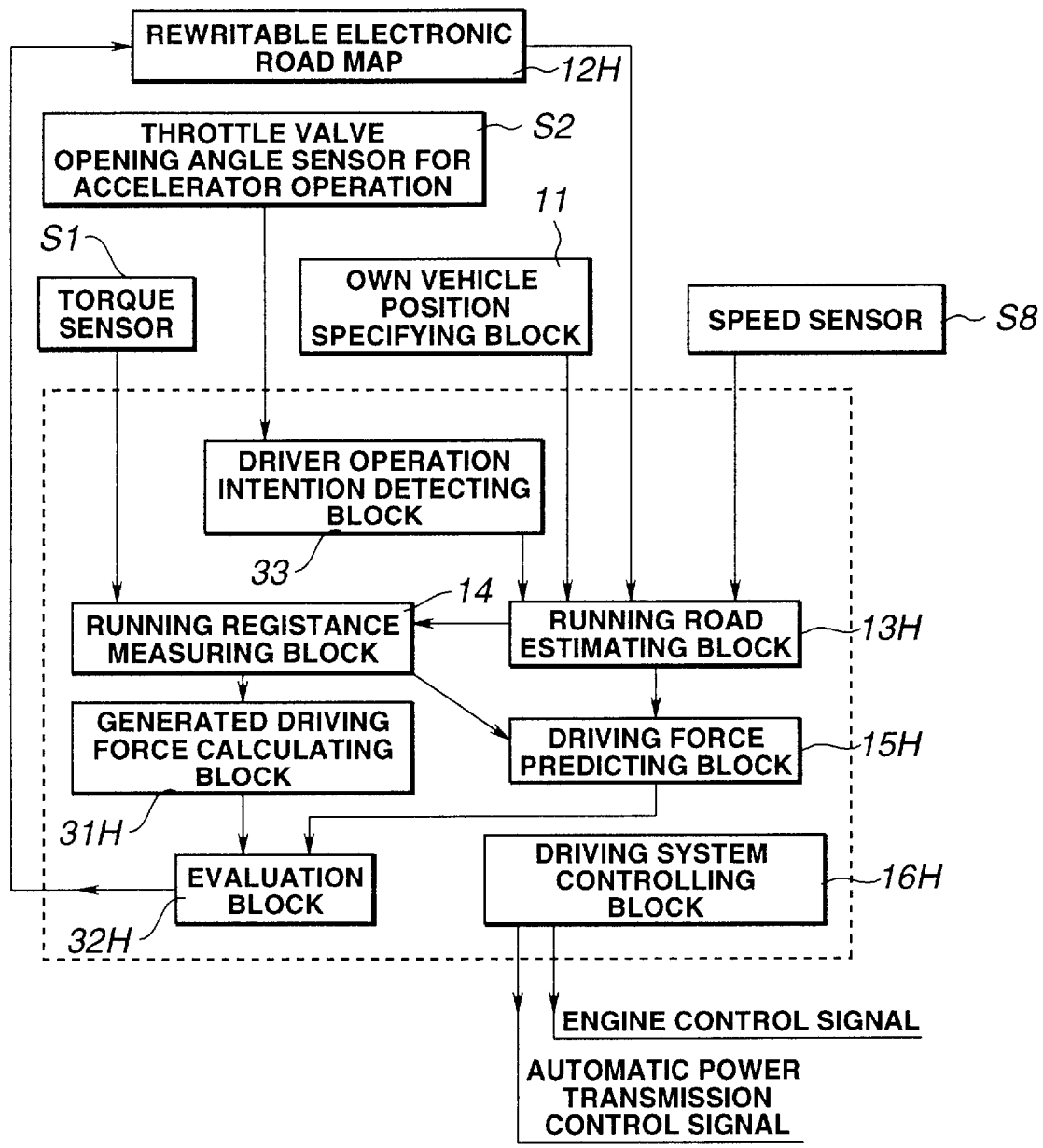
FIG. 16 is a functional block diagram of the vehicular driving force controlling apparatus in an eighth preferred embodiment according to the present invention.

FIG. 16 shows a functional circuit block diagram of an eighth preferred embodiment of the driving force controlling apparatus according to the present invention.

Figure 17A:
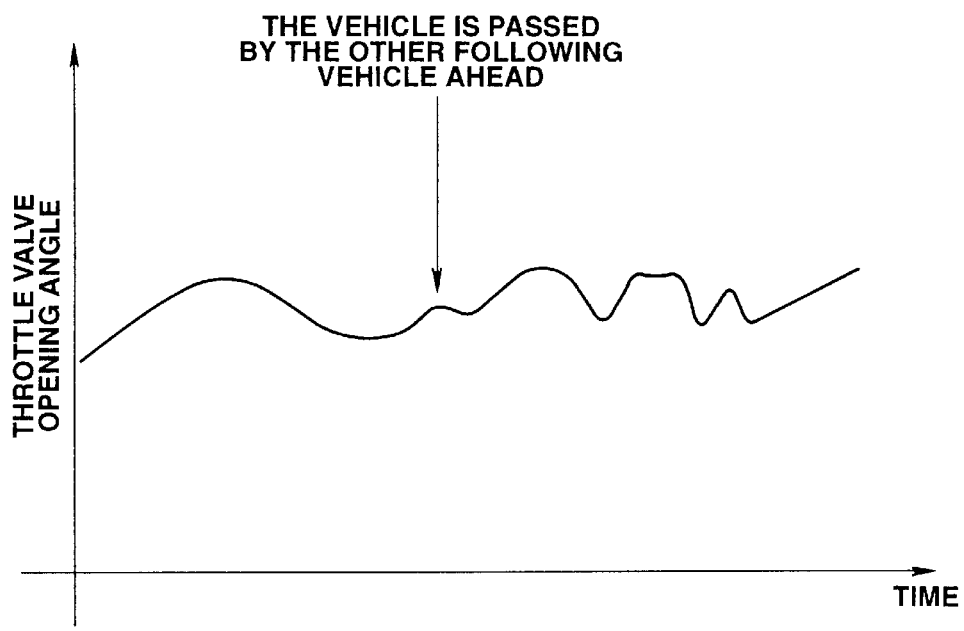
FIGS. 17A and 17B are characteristic graphs representing an accelerator pattern change due to a psychological (mental) state on the basis of which the vehicular driving force controlling apparatus carries out in the eighth embodiment.
Figure 17B:
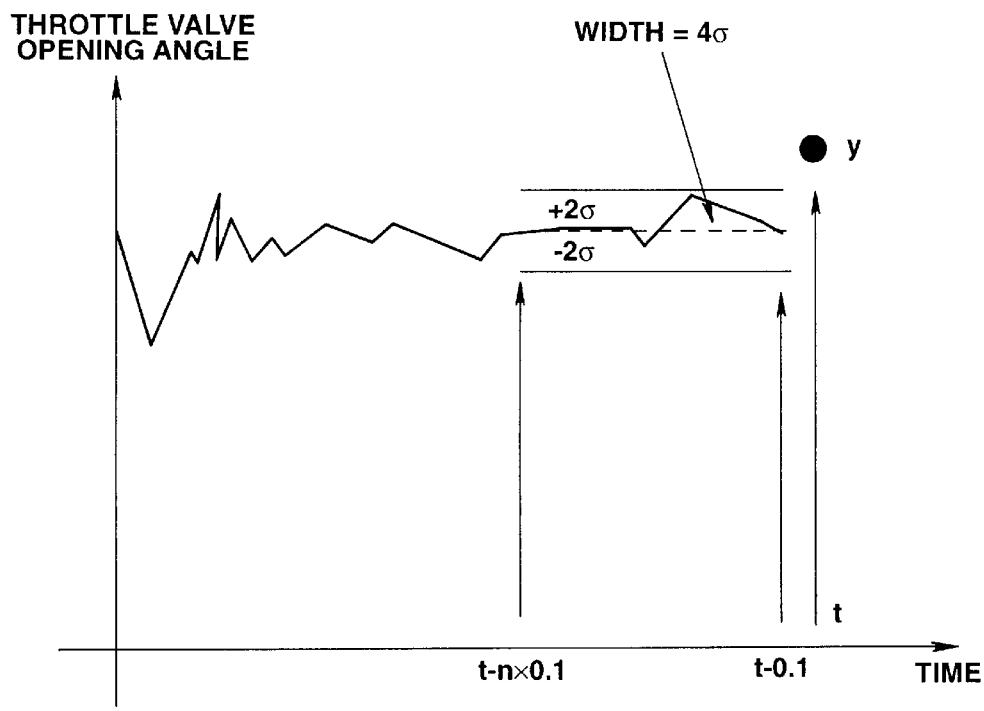

FIGS. 17A and 17B show explanatory views for explaining a detection of the vehicular driver's operation intention.

FIG. 17A shows a variation of an operation on an accelerator due to a change in a mental state of the driver. FIG. 17B shows a detection method of the accelerator operation pattern.

In the eighth embodiment, the driving system controlling pattern is varied before and after the perception of a sudden change in mind of the vehicular driver although the anticipation control described in the seventh embodiment is based. For example, in a case where a gentle driving attitude becomes abruptly changed to an violent attitude, the driving force enforcement has a priority that the suppression of the fuel consumption.

The same reference numerals as in the case of the first embodiment designate corresponding elements shown in FIGS. 1 and 2 and the detailed description of the same reference numerals will be omitted here.

The running road estimating block 13H derives the estimated position several seconds after the time at which the vehicle is at the present position on the road map. The driving force predicting block 15H estimates the required driving force at the estimated position on the basis of the height data at the present position and estimated position read from the running road estimating block 13*h* and transmits the result of estimation to the driving system controlling block 16H. The driving system controlling block 16H determines the settings of the engine and automatic power transmission on the basis of the result of estimation of the required driving force and corrects the setting contents by referring to the past driving force estimation accuracy. The generated driving force calculating block 31H calculates the ever-changing generated driving forces. The evaluation block 32H prepares the data representing the past driving force estimation accuracy from the estimated driving force and generated driving force at the estimated position, the data being recorded into the rewritable electronic road map 12H.

A driver operation intention detecting block 33 detects the ever-changing output state of the throttle opening angle sensor S2 and identifies the present driver's driving pattern.

The running road estimating block 13H performs a data formatting of the outputs of the driver's operation intention detecting block 33 and holds the data formatted outputs of the driver operation intention detecting block 33 together with various data searched from the rewritable electronic road map 12H. The data on the driver's driving pattern is transmitted to the driving system controlling block 16H via the driving force predicting block 15H together with the data representing the past driving force estimation accuracy.

The driving system controlling block 16H corrects the control contents of the driving system based on the anticipation of the height information according to the driver's driving pattern and past driving force estimation accuracy. The driving system controlling block 16H determines whether the driver's driving pattern has varied so as to cope with the driver's driving pattern variation due to a change in mind or mood of the driver and due to a sudden conscious change in the destination and corrects the control content for the engine and automatic power transmission in anticipation of the height information.

In the eighth embodiment, a driver's mental state is identified according to an output state of the throttle valve opening angle sensor S2 and on the basis of the result of identification the settings of the driving characteristics of the engine and automatic power transmission based on the estimated driving force are changed.

Referring back to FIG. 14, suppose that the vehicle is running on the position P of the road.

At this time, the height of the position x the predetermined distance remote from the present position P is previously read from the rewritable electronic road map 12H and the driving force predicting block 15H estimates the ever-changing required driving force on the basis of the gradient variation for the interval of distance up to the position x. The driving system controlling block 16H sets the lean burn control in the engine and the characteristic of the continuously variable transmission (CVT) on the basis of the estimated result of the required driving force. However, if the operating characteristic of the driver (a manner of depression of the accelerator pedal, change in a target vehicle velocity, an abrupt stop of the vehicle due to a direction turn caused by the consciousness change of the driver, and so forth) is suddenly changed, a control target value determined according to the height at the point of road x becomes inappropriate. For example, under such a situation that the settings of the engine and transmission are determined with the vehicle being cruised at the constant speed on the freeway so that the engine is in the lean burn air/fuel mixture ratio control, suppose that the vehicle driver abruptly changes high driving pattern to have the vehicle run at an abrupt acceleration. At this time, since the engine is in the lean burn mixture ratio control mode, an undesired acceleration occurs. Then, the driving system controlling block 16H replaces the control target value at a stage as early as possible when the change in the operation characteristic of the driver is detected so as to cope with the situation of the following abrupt acceleration.

A theory of detection of the driver's driving pattern is based on the fact that the mental state of the driver is strongly reflected on the driver's accelerator operation.

The driver's accelerator pedal depression angle, especially, its standard deviation and its variance have high correlations to the driver's driving intention.

For example, as shown in FIG. 17A, the variation history of the driver's accelerator pedal depression related to the opening angle of the throttle valve when the vehicle driver tries to abruptly vary the running velocity of the vehicle since a mental stress of the driver such that the vehicle is passed by the following vehicle ahead is encountered.

After the passage of the following vehicle ahead of the own vehicle, the standard deviation of the operating variable of the accelerator pedals caused by the driver is expanded.

Therefore, the driver operation intention detecting block 33 always evaluates the standard deviation of the accelerator pedal operating variables by the driver through the opening angle sensor S2 and captures quickly the variation of the opening angle fro the sensor S2 so as to cope with the sudden conscious change of the driver.

For example, as shown in FIG. 17B, the operating variable on the accelerator is detected for each run through 100 milliseconds and the standard deviation and average of the accelerator operations are derived for the data per the past predetermined time (for example, one minute). Then, for example, an upper limit value and a lower limit value for the variations in the accelerator operations are set according to the average value±2×standard deviation $\sigma$. Thus, for the accelerator operating variable observed to fall within the upper and lower limit values, this driver's operation pattern belongs to the same driving pattern. However, if the observed accelerator operating variable exceeds the upper limit value, the driving pattern is varied.

Specifically, suppose that a sampling time is 100 milliseconds at the present time t. The average $\mu$ and standard deviation $\sigma$ of the accelerator opening angle data are derived from the past accelerator opening angle data beginning at (t−0.2) seconds and ended at (t−n·0.1) seconds. It is noted that n denotes a constant defined empirically. As the consequence, the upper limit value is determined as $\mu+2\sigma$ and the lower limit value is determined as $\mu-2\sigma$.

When the accelerator operating variable is y at the time t and the value of y is larger than the upper limit value of $\mu+2\sigma$ or smaller than $\mu-2\sigma$, the driving pattern is drastically varied. However, since one determination cannot find the whole situation, in the case where the data exceeding this range of $4\sigma$ is continued by several numbers of times is determined to be the drastic change in the driving pattern.

In this situation, the driving force to be generated to conform to estimated on the basis of the gradient on the anticipated point of road x is halted and the driving force exerted is such a normal setting content that the large default in the vehicular driveability cannot be impressed to every driver.

That is to say, the driving system controlling block 16H sets the engine air/fuel mixture ratio control mode to the stoichiometric air/fuel mixture ratio control mode and sets the gear range shifting characteristic to the normal characteristic. In addition, in a case where the present control target content is largely different from the control target content corresponding to the normal setting content and the deterioration in the driveability, on the contrary, is considered due to the abrupt change in the settings, a temporal setting change is reserved and the contents of the controls are switched when the driver operates the accelerator so that the valve opening angle is returned to zero. In this case, if the driver does not yet release the accelerator to fully close the throttle valve, the driving system controlling block 16H changes, for the time being, the control target to the normal control target so that the control based on the anticipation of the height information is halted for a predetermined period of time.

Since, in the vehicular driving force controlling apparatus of the eighth embodiment, the settings of the engine and automatic power transmission are quickly transferred to such setting of the characteristics of the engine and automatic power transmission as being able to cope with the variation in the driving pattern if the abrupt variation in the driving pattern occurs due to the mental state of the driver, the driver does not aware of the insufficient output power of the driving system and worsened response characteristic for the own vehicle. In addition, since a gap between the driveabilities involved before and after the change in the settings occurs is relieved, the driver does not confuse such a gap as described above. Another technique of detecting the driver's intentional operation and reflecting the driver's intention of operation on the driving force control includes a technique such that a line of sight of the driver is captured to help the specification of the forward direction of the vehicle at the branch point. For example, with a camera disposed within a vehicular compartment so as to continuously observe a direction of the line of sight of the driver, the driving force controlling apparatus determines that at a position before the intersection, a direction that the line of sight is deflected is the forward direction of the vehicle. This is because in front of the branch point, the number of times the driver views the branched road direction to be forwarded are increased. If this technique is combined with the fourth and fifth embodiments described above, such a situation that the estimation of the branched road to be forwarded becomes erroneous due to the sudden change in his mind can be avoided. Furthermore, a switch associated with a wiper device may be used to determine whether a rain fall or snow fall occurs. Then, if the rain fall or so forth is determined to occur according to the switch position of the wiper device, the distance to the estimated position x from the present position may be shortened to several meters so that the controlled characteristics may not change rapidly even if the estimation becomes erroneous. In this way, the driver's feeling of the incompatibility may be relieved and a safe-driving may be assured.

It is noted that the own vehicle position specifying block in the above-described embodiments may not be limited to the GPS receiver shown in FIG. 2.

It is also noted that the electronic road map is not limited to the CD-ROM play-back unit (CD-ROM driver). For example, the own vehicle position specifying block may utilize the positional information and height information derived from infrastructures via electromagnetic waves or ultra-red rays irradiated from installations disposed on sides of roads (recently, VICS (Vehicle Information and Communication System in Japan) may be utilized). The electronic road map is not only constituted by a generally available CD-ROM but also may be constituted by a magnet-optic disc (MO), PD (Photophase variable disc), a floppy disc, a ROM card for different regional purposes (destinations) prepared individually at offices.

What is claimed is:

1. A control apparatus for an automotive vehicle, comprising:
    a) electronic road map storing means for storing a road map information, said road map information including at least a gradient information of roads;
    b) vehicle present position determining means for determining a present position of the vehicle;
    c) running road estimating means for referring to the stored road map information using present position of the vehicle so as to receive said road map information for the vehicle, and for estimating a future position of the vehicle, said estimated future position of the vehicle being a future position of the vehicle several seconds after a time at which the vehicle has been placed at the determined present position;
    d) running resistance measuring means for deriving a present vehicle load condition imposed on a vehicular driving system at the determined present position of the vehicle;
    e) driving force predicting means for correcting the present vehicular load condition at the determined present position of the vehicle so as to predict a required driving force at the future estimated position of the vehicle as a function of the gradient information between the determined present position of the vehicle and the estimated future position of the vehicle; and
    f) vehicular driving system controlling means for adjusting in advance a setting of a driving characteristic of at least one of a vehicular engine and an engine associated automatic power transmission installed in the vehicle driving system as a function of the predicted driving force at the estimated future position of the vehicle so as to suppress a fuel consumption as low as possible within a range such that the fuel consumption enables the vehicular driving system to exert the required driving force at the estimated future position of the vehicle.

2. A control apparatus for an automotive vehicle as claimed in claim 1, wherein said driving force predicting means further comprises:
    driving force margin calculating means for estimating a required driving force margin at the estimated future position of the vehicle as a function of at least one of an input operating variable of the vehicular driving system and an output operating variable of the vehicular driving system, and
    wherein said vehicular driving system controlling means adjusts the setting of the driving characteristic of at least one of the automotive engine and the engine associated automatic power transmission in advance so as to correspond to the required driving force including the required driving force margin.

3. A control apparatus for an automotive vehicle as claimed in claim 1, wherein said driving system controlling means comprises vehicular driving system total controlling means for selecting any one of a plurality of combinations which corresponds to the required driving force, the combinations including a combination between an air-fuel mixture ratio of the engine and a gear range shifting characteristic of the automatic power transmission, and for adjusting a modification timing of the settings of the combinations so as to secure a continuity in a driveability of the vehicular driving system, thus, performing a total control over the vehicular driving system.

4. A control apparatus for an automotive vehicle, comprising:
    a) electronic road map storing means for storing a road map information, said road map information including at least a gradient information of roads;
    b) vehicle present position specifying means for specifying a present position of the vehicle;
    c) running road estimating means for referring to the stored road map information as a function of the specified present position of the vehicle so as to derive a present position of the vehicle with respect to the road map information, and for estimating a future position of the vehicle as a function of the derived present position of the vehicle, said estimated future position of the vehicle being a future position of the vehicle several seconds after the vehicle has been placed at the specified present position;
    d) vehicular running resistance measuring means for deriving a present vehicle load condition imposed on a vehicular driving system at the specified present position of the vehicle;
    e) driving force predicting means for correcting the present vehicular load condition at the specified present position of the vehicle so as to predict a required driving force at the estimated future position of the vehicle as a function of the gradient information between the specified present position of the vehicle and the estimated future position of the vehicle searched from the electronic road map storing means;
    f) driving system controlling means for adjusting in advance a setting of a driving characteristic of at least one of a vehicular engine and an engine associated automatic power transmission installed in the vehicle driving system as a function of the predicted driving force at the estimated future position of the vehicle so as to suppress a fuel consumption as low as possible within a range such that the fuel consumption enables the vehicular driving system to exert the required driving force at the estimated position of the vehicle; and g) target point inputting means for inputting and setting a target position of the vehicle on a route of travel to which the vehicle is to reach through said target point inputting means by an operator in connection with the road map information, and wherein said running road estimating means comprises moving means for moving the estimated future position of the vehicle along a road branched from a branching point and having a relatively high directional tendency toward the set target position of the route of travel in a case where the estimated future position of the vehicle is placed so as to jump over the branching point with respect to the present position of the vehicle.

5. A control apparatus for an automotive vehicle as claimed in claim 4, wherein said driving system controlling means comprises vehicular driving system total controlling means for selecting any one of a plurality of combinations which corresponds to the required driving force, the combinations including a combination between an air-fuel mixture ratio of the engine and a gear range shifting characteristic of the automatic power transmission, and for adjusting a modification timing of the settings of the combinations so as to secure a continuity in a driveability of the vehicular driving system, thus, performing a total control over the vehicular driving system.

6. A control apparatus for an automotive vehicle comprising:

a) electronic road map storing means for storing a road map information, said road map information including at least a gradient information of roads;

b) vehicle present position determining means for determining a present position of the vehicle;

c) running road estimating means for referring to the stored road map information using the determined present position of the vehicle so as to receive said road map information, and for estimating a future position of the vehicle as a function of the determined present position of the vehicle, said estimated future position of the vehicle being a future position of the vehicle several seconds after a time at which the vehicle has been placed at the present position;

d) running resistance measuring means for deriving a present vehicle load condition imposed on a vehicular driving system at the determined present position of the vehicle;

e) driving force predicting means for correcting the present vehicular load condition at the determined present position of the vehicle so as to predict a required driving force at the estimated future position of the vehicle as a function of the gradient information between the determined present position of the vehicle and the estimated future position of the vehicle from the electronic road map storing means; and f) driving system controlling means for adjusting in advance a setting of a driving characteristic of at least one of a vehicular engine and an engine associated automatic power transmission installed in the vehicle driving system as a function of the predicted driving force at the estimated future position of the vehicle so as to suppress a fuel consumption as low as possible within a range such that the fuel consumption enables the vehicular driving system to exert the required driving force at the estimated future position of the vehicle, and wherein said running road estimating means further comprises forward direction identifying means for detecting an operation intent of the vehicular driver corresponding to a forward direction of the vehicle and identifying the forward direction of the vehicle at a road branching point and estimated future position moving means for moving the estimated future position along a branched road corresponding to the forward direction of the vehicle identified by said forward direction identifying means when the estimated future position of the vehicle is placed so as to jump over the road branching point.

7. A control apparatus for an automotive vehicle as claimed in claim 6, wherein said driving system controlling means comprises vehicular driving system total controlling means for selecting any one of a plurality of combinations which corresponds to the required driving force, the combinations including a combination between an air-fuel mixture ratio of the engine and a gear range shifting characteristic of the automatic power transmission, and for adjusting a modification timing of the settings of the combinations so as to secure a continuity in a driveability of the vehicular driving system, thus, performing a total control over the vehicular driving system.

8. A control apparatus for an automotive vehicle comprising:

a) electronic road map storing means for storing a road map information, said road map information including at least a gradient information of roads, said electronic road map storing means being arranged so as to be rewritable therein on a new information at each point on a running route of travel of the vehicle in relation to the road map information;

b) vehicle present position determining means for determining a present position of the vehicle;

c) running road estimating means for referring to the stored road map information using the determined present position of the vehicle so as to receive said road map information, and for estimating a future position of the vehicle as a function of the determined present position of the vehicle, said estimated future position of the vehicle being the future position of the vehicle several seconds after a time at which the vehicle has been placed at the determined present position;

d) running resistance measuring means for deriving a present vehicle load condition imposed on a vehicular driving system at the determined present position of the vehicle;

e) driving force predicting means for correcting the present vehicular load condition at the determined present position of the vehicle so as to predict a required driving force at the estimated future position of the vehicle as a function of the gradient information between the determined present position of the vehicle and the estimated future position of the vehicle;

f) driving system controlling means for adjusting in advance a setting of a driving characteristic of at least one of a vehicular engine and an engine associated automatic power transmission installed in the vehicle driving system in advance in time as a function of the predicted driving force at the estimated future position of the vehicle so as to suppress a fuel consumption as low as possible within a range such that the fuel consumption enables the vehicular driving system to exert the required driving force at the estimated future position of the vehicle; and g) running locus recording means for detecting an ever-changing information related to the driving force generated by the vehicle during a run of the vehicle and for storing and recording the detected ever-changing information on said rewritable electronic road map storing means, and wherein said driving system controlling means comprises correcting means for correcting in advance a content of adjustment according to the required driving force as a function of the past ever-changing information related to the driving force generated by the vehicle at the estimated future position of the vehicle.

9. A control apparatus for an automotive vehicle as claimed in claim 8, wherein said driving system controlling means comprises vehicular driving system total controlling means for selecting any one of a plurality of combinations which corresponds to the required driving force, the combinations including a combination between an air-fuel mixture ratio of the engine and a gear range shifting characteristic of the automatic power transmission, and for adjusting a modification timing of the settings of the combinations so as to secure a continuity in a driveability of the vehicular driving system, thus, performing a total control over the vehicular driving system.

10. A control apparatus for an automotive vehicle as claimed in claim 8, wherein the ever-changing information related to the driving force generated by the vehicle includes the ever-changing information related to a vehicle speed exerted by the vehicle.

11. A control apparatus for an automotive vehicle comprising:

a) electronic road map storing means for storing a road map information, said road map information including at least a gradient information of roads, said electronic road map storing means being arranged so as to be rewritable therein on a new information at each point on a running route of travel of the vehicle in relation to the road map information;

b) vehicle present position predicting means for determining a present position of the vehicle;

c) running road estimating means for referring to the stored road map information using the determined present position of the vehicle so as to receive said road map information, and for estimating a future position of the vehicle as an estimated position of the vehicle as a function of the determined present position of the vehicle, said estimated future position of the vehicle being a future position of the vehicle several seconds after a time at which the vehicle has been placed at the determined present position;

d) running resistance measuring means for deriving a present vehicle load condition imposed on a vehicular driving system at the determined present position of the vehicle;

e) driving force predicting means for correcting the present vehicular load condition at the determined present position of the vehicle so as to predict a required driving force at the estimated future position of the vehicle as a function of the gradient information between the determined present position of the vehicle and the estimated future position of the vehicle;

f) driving system controlling means for adjusting in advance a setting of a driving characteristic of at least one of a vehicular engine and an engine associated automatic power transmission installed in the vehicle driving system as a function of the predicted driving force at the estimated future position of the vehicle so as to suppress a fuel consumption as low as possible within a range such that the fuel consumption enables the vehicular driving system to exert the required driving force at the estimated future position of the vehicle;

g) generated driving force deriving means for deriving an ever-changing driving force output state of the vehicle during a run of the vehicle; and h) evaluating means for evaluating a numerical value related to a gap between the required driving force at the estimated future position of the vehicle and an actual driving force output state at the estimated future position of the vehicle and storing and recording the derived numerical value on said rewritable electronic road map storing means, and wherein said driving system controlling means comprises correcting means for correcting a content of an adjustment in anticipation according to the past numerical value related to said gap searched from said rewritable electronic road map storing means.

12. A control apparatus for an automotive vehicle as claimed in claim 11, wherein said driving system controlling means comprises vehicular driving system total controlling means for selecting any one of a plurality of combinations which corresponds to the required driving force, the combinations including a combination between an air-fuel mixture ratio of the engine and a gear range shifting characteristic of the automatic power transmission, and for adjusting a modification timing of the settings of the combinations so as to secure a continuity in a driveability of the vehicular driving system, thus, performing a total control over the vehicular driving system.

13. A control apparatus for an automotive vehicle comprising:

a) electronic road map storing means for storing a road map information, said road map information including at least a gradient information of roads;

b) vehicle present position determining means for determining a present position of the vehicle;

c) running road estimating means for referring to the stored road map information using the determined present position of the vehicle so as to receive said road map information, and for estimating a future position of the vehicle as an estimated future position of the vehicle as a function of the determined present position of the vehicle, said estimated future position of the vehicle being a future present position of the vehicle several seconds after a time at which the vehicle has been placed at the determined present position;

d) running resistance measuring means for deriving a present vehicle load condition imposed on a vehicular driving system at the determined present position of the vehicle;

e) driving force predicting means for correcting the present vehicular load condition at the determined present position of the vehicle so as to predict a required driving force at the estimated future position of the vehicle as a function of the gradient information between the determined present position of the vehicle and the estimated future position of the vehicle;

f) driving system controlling means for adjusting in advance a setting of a driving characteristic of at least one of a vehicular engine and an engine associated automatic power transmission installed in the vehicle driving system as a function of the derived driving force at the estimated future position of the vehicle so as to suppress a fuel consumption as low as possible within a range such that the fuel consumption enables the vehicular driving system to exert the required driving force at the estimated future position of the vehicle; and g) vehicular driver operation intention detecting means for detecting an ever-changing operating variable of an engine throttle valve of the vehicle by a vehicular driver during the run of the vehicle so as to determine a variation of a driving pattern of the vehicular driver, and wherein said driving system controlling means comprises correcting means for correcting a content of the adjustment in advance of the setting so as to relieve the suppression of the fuel consumption when a variation width in the operating variable of the engine throttle valve detected by the vehicular driver operation intention detecting means is expanded.

14. A control apparatus for an automotive vehicle as claimed in claim 13, wherein said driving system controlling means comprises vehicular driving system total controlling means for selecting any one of a plurality of combinations which corresponds to the required driving force, the combinations including a combination between an air-fuel mixture ratio of the engine and a gear range shifting characteristic of the automatic power transmission, and for adjusting a modification timing of the settings of the combinations so as to secure a continuity in a driveability of the vehicular driving system, thus, performing a total control over the vehicular driving system.

15. A method for controlling a driving force exerted by an automotive vehicle, comprising the steps of:

a) storing a road map information, said road map information including at least a gradient information of roads;

b) determining a present position of the vehicle using a GPS receiving system;

c) referring to the stored road map information as a function of a result of determination of the present position of the vehicle at the step b) so as to derive a present position of the vehicle with respect to the road map information, and estimating a future position of the vehicle as a function of the derived present position of the vehicle, said estimated future position of the vehicle being a future position of the vehicle several seconds after a time at which the vehicle has been placed at the determined present position;

d) deriving a present vehicle load condition imposed on a vehicular driving system at the determined present position of the vehicle;

e) correcting the present vehicular load condition at the determined present position of the vehicle so as to derive a required driving force at the estimated future position of the vehicle as a function of the gradient information between the present position of the vehicle and the estimated future position of the vehicle searched from step a); and f) adjusting in advance a setting of a driving characteristic of at least one of a vehicular engine and an engine associated automatic power transmission installed in a vehicle driving system as a function of the derived driving force at the estimated future position of the vehicle so as to suppress a fuel consumption as low as possible within a range such that the fuel consumption enables the vehicular driving system to exert the required driving force at the estimated future position of the vehicle.

16. A method for controlling a driving force exerted by an automotive vehicle as claimed in claim 15, wherein said several seconds are about two seconds and longer.

17. A method for controlling a driving force exerted by an automotive vehicle as claimed in claim 16, wherein said step e) further comprises the step g), of monitoring at least one of an operation input state and an output state of the vehicular driving system and estimating a driving force margin required at said estimated future position as a function of a result of the monitoring, and wherein at said step f), the setting of the driving force characteristic of at least one of the vehicular engine and the engine associated automatic power transmission is adjusted in advance as a function of said driving force and said estimated driving force margin required at the estimated future position.

18. A method for controlling a driving force exerted by an automotive vehicle as claimed in claim 16, which further comprises the step g) responding to vehicular occupant's setting of a route of travel and of a target position to which the vehicle is to be reached along the set route of travel in connection with road map information displayed on a screen of a display unit and wherein said step c) further comprises the steps of h) determining whether the estimated position is placed at a position jumped over a road branching point and i) moving said estimated position along a road branched from said road branching point which has a relatively high directional tendency toward the target position along the set route of travel.

19. A method for controlling a driving force exerted by an automotive vehicle as claimed in claim 16, wherein said step c) further comprises the steps of: g) monitoring a vehicular driver's operation intent corresponding to a forward direction toward which the vehicle is to be forwarded so as to identify the forward direction at a road branching point and h) moving said estimated future position along a road branched from the road branching point corresponding to the forward direction of the vehicle when the estimated future position of the vehicle is jumped over the road branching point.

20. A method for controlling a driving force exerted by an automotive vehicle as claimed in claim 16, which further comprises the step of g) monitoring an ever-changing information related to the driving force generated during a vehicular run and recording and storing the monitored ever-changing information on a rewritable electronic road map which is so arranged and constructed as to enable rewriting of a new information at each point of a route of travel along which the vehicle is to run and wherein said step f) further comprises the step of h) correcting a content of the adjustment at said step f) in accordance with the required driving force as a function of a past ever-changing information related to the driving force the vehicle generated during the vehicular run searched from said rewritable electronic road map.

21. A method for controlling a driving force exerted by an automotive vehicle as claimed in claim 20, wherein the ever-changing information related to the driving force the vehicle generated includes a vehicle velocity.

22. A method for controlling a driving force exerted by an automotive vehicle as claimed in claim 16, which further comprises the steps of: g) monitoring an ever-changing driving force output state of the vehicle during the run of the vehicle; h) deriving a numerical value related to a gap between the estimated required driving force to be exerted at the estimated future position and an actually monitored driving force exerted at the estimated future position so as to evaluate the required driving force and i) recording and storing the numerical value related to the gap onto a rewritable electronic road map which is so arranged and constructed as to enable writing of a new information at each point of a route of travel along which the vehicle is to run and wherein said step f) further comprises the step of: i) correcting a content of adjustment at said step f) in accordance with the required driving force as a function of a past numerical value related to the gap stored and recorded on the rewritable electronic road map.

23. A method for controlling a driving force exerted by an automotive vehicle as claimed in claim 16, which further comprises the steps of: g) monitoring an ever-changing opening angle of an engine throttle valve operated by a vehicle driver of the vehicle through an accelerator of the vehicle so as to detect a variation in a vehicle driver's driving pattern; h) determining whether a variation width of the monitored ever-changing opening angle is expanded so as to exceed a threshold value of the variation width; and i) correcting a content of the adjustment of the setting carried out at said step f) so as to relieve the suppression of the fuel consumption when determining that the variation width is expanded at said step g).

24. A method for controlling a driving force exerted by an automotive vehicle as claimed in claim 15, wherein, at said step f), a total control of the driving system of a vehicle is carried out such that any one of a plurality of combinations which corresponds to the required driving force, the combinations including a combination between an air/fuel mixture ratio of an engine of the vehicular driving system and a gear range shifting characteristic of an engine associated automatic power transmission, and a modification timing of the settings of the combinations is adjusted in advance in time so as to secure a continuity in a driveability of the vehicular driving system.

25. A control apparatus for an automotive vehicle, comprising:
 a) an electronic road map storage unit for storing a road map information, the road map information including at least a gradient information of roads;
 b) vehicle present position determinator for determining a present position of the vehicle;
 c) a running road estimator for referring to the stored road map information using the determined present position of the vehicle and for estimating a future position of the vehicle as an estimated future position of the vehicle as a function of the determined present position of the vehicle, a estimated future position of the vehicle being a future position of the vehicle several seconds after a time at which the vehicle is placed at the determined present position of the vehicle;
 d) a running resistance measuring instrument for deriving a vehicle load condition imposed on a vehicular driving system at the determined present position of the vehicle;
 e) a driving force predictor for correcting the present vehicular load condition at the determined present position of the vehicle so as to predict a required driving force at the estimated future position of the vehicle as a function of the gradient information between the determined present position of the vehicle and the estimated position of the vehicle estimated from the electronic road map storage unit; and
 f) a vehicular driving system controller for adjusting in advance a setting of a driving characteristic of at least one of a vehicular engine and an engine associated with an automatic power transmission installed in the vehicle driving system as a function of the predicted driving force at the estimated future position of the vehicle so as to suppress a fuel consumption as low as possible within a range such that the fuel consumption enables the vehicular driving system to exert the required driving force at the estimated future position of the vehicle.

26. A control apparatus for a driving system of an automotive vehicle, the driving system including at least one of a vehicular engine and an engine associated automatic power transmission installed in the vehicle, the control apparatus comprising:
 a road map memory for storing a road map information, the road map information including gradient information of roads;
 a position sensor for detecting a present position of the vehicle;
 a determination circuit for determining the present position of the vehicle on the map information according to the position detected by the position sensor;
 a running resistance measuring circuit for measuring a running distance imposed on the vehicle at the detected position;
 a future position estimating circuit for estimating a future position of the vehicle on the road map information, which represents the position of the vehicle a few seconds in the future, according to the determined present position and a running condition of the vehicle at the determined present position;
 a driving force calculating circuit for calculating the driving force required at the estimated future position according to the running resistance at the determined present position and the gradient information between the determined present position and the estimated future position stored in the road map memory; and
 a driving controller for controlling a driving characteristic of the driving system including at least one of a vehicular engine and an engine associated automatic power transmission so that the characteristic is optimum when the vehicle runs at the future position.

* * * * *